(12) United States Patent
Smith

(10) Patent No.: US 11,871,230 B1
(45) Date of Patent: Jan. 9, 2024

(54) SYSTEMS AND METHODS FOR COORDINATED SECURITY ENHANCEMENT

(71) Applicant: CABLE TELEVISION LABORATORIES, INC., Louisville, CO (US)

(72) Inventor: David Daniel Smith, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 15 days.

(21) Appl. No.: 17/084,287

(22) Filed: Oct. 29, 2020

(51) Int. Cl.
| | |
|---|---|
| *H04W 12/102* | (2021.01) |
| *H04B 7/0413* | (2017.01) |
| *H04B 17/10* | (2015.01) |
| *H04L 9/40* | (2022.01) |
| *H04W 12/0431* | (2021.01) |

(52) U.S. Cl.
CPC ........ *H04W 12/102* (2021.01); *H04B 7/0413* (2013.01); *H04B 17/104* (2015.01); *H04L 63/06* (2013.01); *H04L 63/18* (2013.01); *H04W 12/0431* (2021.01)

(58) Field of Classification Search
CPC ............ H04W 12/102; H04W 12/0431; H04B 7/0413; H04B 17/104; H04L 63/06; H04L 63/18
See application file for complete search history.

(56) References Cited

U.S. PATENT DOCUMENTS

| | | | | |
|---|---|---|---|---|
| 11,050,723 | B1* | 6/2021 | Mahdavi | ............... H04L 9/0844 |
| 2008/0102812 | A1* | 5/2008 | Chari | ....................... H01Q 9/32 |
| | | | | 455/424 |
| 2009/0074051 | A1* | 3/2009 | Manapragada | .... H04N 21/4112 |
| | | | | 375/240 |

* cited by examiner

*Primary Examiner* — Mazda Sabouri
(74) *Attorney, Agent, or Firm* — David Daniel Smith; Cable Television Laboratories, Inc.

(57) ABSTRACT

A method of securing data transmission from a plurality of spatially distributed transmitters to a receiving device includes steps of: determining first and second receiving device propagation delays for first and second transmission paths, respectively; portioning a contiguous stream of data into first and second data portions; transmitting the first data portion by the first transmission path utilizing a coordinating system and first propagation delay, and the second data portion such that first and second data portions arrive at the receiving device during a first and second time period, respectively, wherein, when seen from the receiving device, the first data portion and second data portion are seen as transmitted as contiguous data from the same transmitter, and wherein that transmitted data is received as a contiguous stream of transmitted data at a location of the receiving device.

12 Claims, 18 Drawing Sheets

SYSTEMS AND METHODS FOR COORDINATED SECURITY ENHANCEMENT

FIELD

The field of the disclosure relates generally to data transmission systems, and particularly to management of data transmission security using separate and coordinated transmission paths.

BACKGROUND

Increasing demand for bandwidth for data transmission over communication systems and networks has led to the use of higher frequencies, smaller cells, and higher density distribution of antenna sites within such systems and networks. Additionally, wireless networks have evolved at the same time toward implementations using beamforming, that is, narrow radiated beams and multiple radiated beams, to reduce interference and improve performance.

These recent beamforming implementations have been useful with stationary communication targets, where the operable communication link between the target and the radiating antenna remains relatively stable. Beamforming implementations with respect to moving targets (e.g., a cell phone/smartphone), however, where the mobile devices are often used while moving in and out of the operable zone of a radiated beam (e.g., a smart phone used in a traveling automobile). Accordingly, a moving mobile device may have to drop a communication link with an antenna of, for example, a nearby first small cell antenna when the device has moved out of the range of the first antenna. The device will often then establish a new link with a second antenna as the mobile device moves into the range of the second antenna. The relative communication links with each antenna, however, may not be the same, and communication with the mobile device may therefore suffer as the device moves between radiated beams and hands off the link from one antenna to another.

SUMMARY

In an embodiment, a coordinated wireless security system and method transmits data destined for an end device by distributing the data between a plurality of coordinated transmitters and synchronous transmitting the data such that the end device receives a single, uniform stream of data. Coordination of the transmitters utilizes a coordinating system, a non-limiting example of which includes a universal clock configured to orchestrate the data transmission by the plurality of transmitters. These techniques results in a secure spot for receiving the data transmission from the several transmitters, and for which, in an embodiment, all of the transmitted data may only be accessed within the area of the spot formed at the location where the plurality of signals, such as radiated beams, overlap.

In an embodiment, one or more of a plurality of transmitters are configured as radiated beamforming transmitters capable of generating a narrow transmission beam. In other embodiments, due to the division of data between a plurality of signals, one or more of the spatially separated transmitters are not configured to be beamforming transmitters.

In an embodiment, data is divided and distributed to a plurality of transmitters for synchronous transmission to an end device. In one example, in a data transmission system utilizing a plurality of transmitters to transmit a data stream, the data transmission system may divide the data equally or unequally between the plurality transmitters for collective transmission to the end device.

In an embodiment, a wireless regional access network is configured for distribution and coordination of transmitted data. In an aspect, the wireless regional access network is further configured for manipulating distribution of security keys for security enhancement.

In an embodiment, a method is provided for securing a transmission of data from a plurality of spatially distributed transmitters to a receiving device. The transmitted data is received as a contiguous stream of the transmitted data at a location of the receiving device. The method includes steps for determining a first propagation delay associated with a first transmission path to a receiving device, determining a second propagation delay associated with a second transmission path to the receiving device, portioning a contiguous stream of data into a first data portion and a second data portion, transmitting the first data portion by the first transmission path utilizing a coordinating system and the first propagation delay such that the first data portion arrives at the receiving device during a first time period, and transmitting the second data portion by the second transmission path utilizing the coordinating system and the second propagation delay such that the second data portion arrives at the receiving device during a second time period. The first and second data portions arrive at the receiving device such that it appears to the receiving device that the first data portion and second data portion are transmitted from the same transmitter as contiguous data.

In an embodiment, a method is provided for securing a transmission of a contiguous stream of data from a plurality of spatially distributed transmitters to a single receiving device such that the transmitted distributed stream of data is received at a location of the receiving device and assembled as a received contiguous stream of the transmitted data. The method includes steps of portioning an input stream of data into a plurality of data portions, transmitting the plurality of data portions by respective transmission paths of the spatially distributed transmitters utilizing a coordinating system such that the plurality of data portions arrive at the receiving device in a first order, and arranging the received plurality of data portions from the first order into a second order for the received contiguous stream at the receiving device. The second order of the received contiguous stream follows a sequence substantially similar to a sequence of the input stream of data.

In an embodiment, a secure data transmission system includes one or more radiated beamforming radio transmitters, each radiated beamforming radio transmitter being configured for generating a directional narrow radio transmission beam. The system further includes a receiving device configured to receive the directional narrow radio transmission beams from each of the one or more radiated beamforming radio transmitters. The system further includes a coordinating system having a universal clock configured to generate at least one of a clock period and a timestamp, and a data portioner configured to (i) receive a stream of contiguous data, (ii) portion the stream of contiguous data into separate data portions, (iii) send at least one of the separate data portions to at least one of the one or more radiated beamforming radio transmitters, and (iv) send another of the separate data portions to another transmitter spatially separated from the at least one of the one or more radiated beamforming radio transmitters.

Various refinements exist of the features noted above in relation to the various aspects of the present disclosure. Further features may also be incorporated in these various aspects as well. These refinements and additional features may exist individually or in any combination. For instance, various features discussed below in relation to one or more of the illustrated embodiments may be incorporated into others of the above-described aspects of the present disclosure, alone or in combination. This brief summary is intended only to familiarize the reader with certain aspects and contexts of the present disclosure without limitation of the claimed subject matter.

BRIEF DESCRIPTION OF THE DRAWINGS

FIGS. 1-18 depict exemplary embodiments of systems, methods, and apparatuses described herein. These and other features, aspects, and advantages of the present disclosure will become better understood when the following detailed description is read with reference to the accompanying drawings in which like characters represent like parts throughout the drawings, wherein:

FIG. 1 is a schematic illustration of an exemplary transmission system, in accordance with an embodiment.

FIG. 2 is a schematic illustration of an alternative transmission system, in accordance with an embodiment.

FIG. 4 illustrates a noise floor effect on the data distribution timing diagram depicted in FIG. 3A.

FIG. 5 illustrates a data timing diagram utilizing a rotating security key, which may be implemented for the transmission system depicted in FIG. 2.

FIG. 6 illustrates an alternative data timing diagram utilizing a single-path security key.

FIG. 7 illustrates an alternative data timing diagram utilizing a random security key.

FIG. 8 is a schematic illustration depicting an exemplary security key recombination subsystem.

FIG. 9 is a schematic illustration of an exemplary multiple-input multiple-output data transmission system, in accordance with an embodiment.

FIG. 10 depicts an exemplary data distribution timing diagram for the transmission system depicted in FIG. 9.

FIG. 11 depicts an alternative data distribution timing diagram for the transmission system depicted in FIG. 9.

FIG. 12 depicts an alternative data distribution timing diagram for the transmission system depicted in FIG. 9.

FIG. 13 is a schematic illustration of an alternative data transmission system, in accordance with an embodiment.

FIG. 14 is a schematic is a schematic illustration of a logical architecture for the central coordination system depicted in FIG. 1.

FIG. 15 is a flow diagram of an exemplary data transmission process that may be implemented with one or more of the embodiments described herein.

FIG. 16 is a flow diagram of an alternative data transmission process that may be implemented with one or more of the embodiments described herein.

FIG. 17 is a flow diagram of an alternative data transmission process that may be implemented with one or more of the embodiments described herein.

FIG. 18 is a flow diagram of an alternative data transmission process that may be implemented with one or more of the embodiments described herein.

Figure 1:
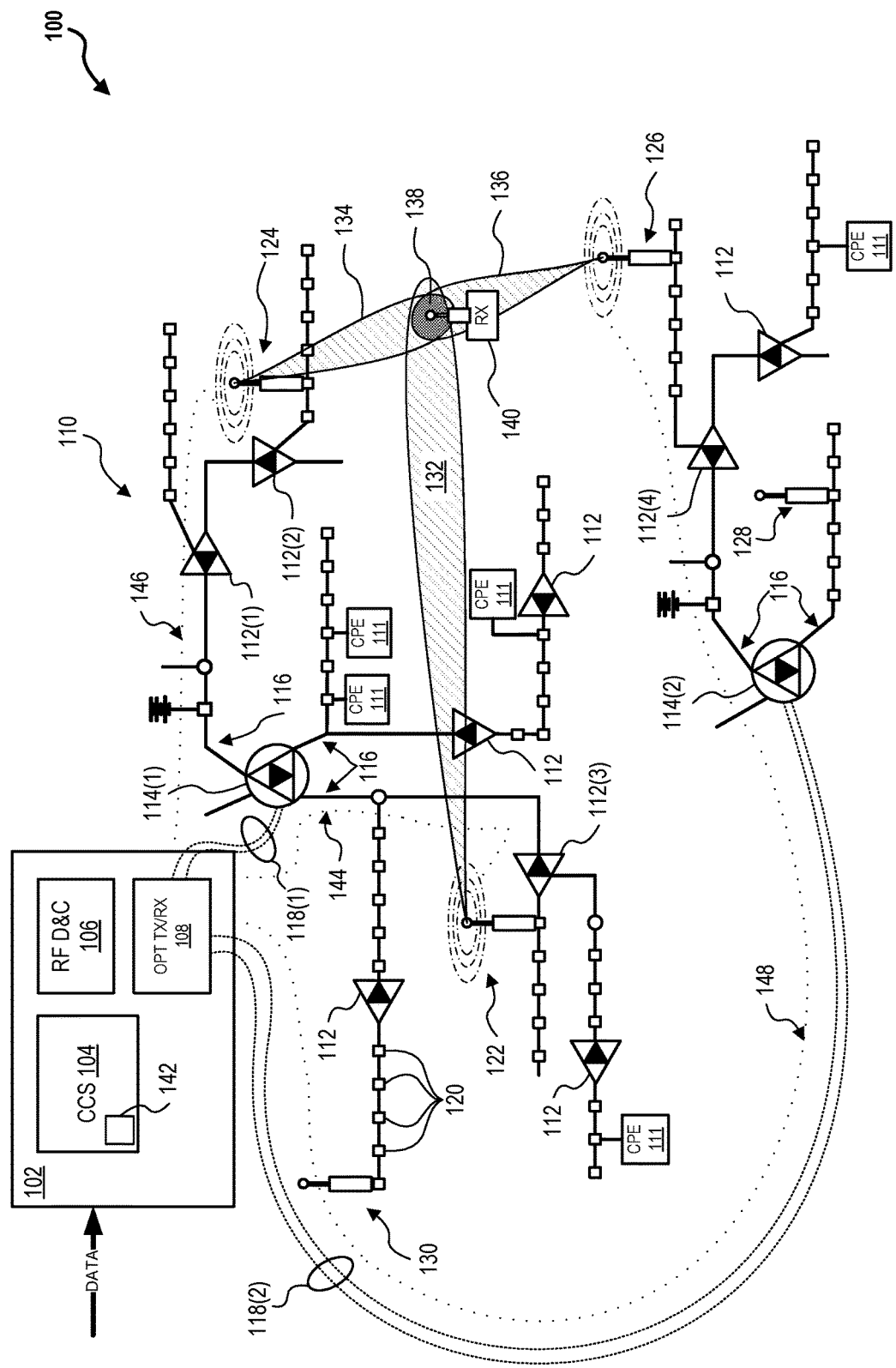

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

Although specific features of various embodiments may be shown in some drawings and not in others, this is for convenience only. Any feature of any drawing may be referenced and/or claimed in combination with any feature of any other drawing.

DETAILED DESCRIPTION

The following detailed description discusses embodiments of the disclosure by way of example and not by way of limitation. It is contemplated that the disclosure has general application to analytical and methodical embodiments of leveraging a multi-transmission wireless environment for improved security through flexible distribution of encryption or security keys and/or payload in industrial, commercial, and residential applications. Unless specified otherwise, an encryption or security key herein indicates either or both of a public key and a private key or a security key that is needed in a data transmission system or network to retrieve a file key to decrypt an encrypted data portion.

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

In an embodiment, the present coordinated wireless security systems and methods provide a solution to the problems faced by conventional systems using techniques to distribute data among a plurality of coordinated transmitters for wireless transmission to a receiving device. That is, instead of receiving data from only one transmitter at a time, a receiving device (e.g., a mobile phone) may receive different portions of the data from different respective transmitters acting in a coordinated fashion. In an exemplary embodiment, the original data that is to be transmitted to the receiving device is first divided into portions, and then distributed to the plurality of coordinated transmitters for synchronous transmission to the receiving device. According to these exemplary techniques, the respective transmitted signal from each transmitter need only carry a portion of the data intended for the receiving device.

In some embodiments, transmission from the several transmitters may be simultaneous transmission. In other embodiments, the transmission may be staggered among the transmitters. In an exemplary embodiment, the distributed data transmission among the transmitters is synchronized utilizing a coordination system, which thus serves to function as a "universal clock" to ensure the correct portion of distributed data arrives at the receiving device at the correct time. In at least one embodiment, the distribution of data is performed such that respective transmitter signals carrying the distributed data portions overlap only at the location of the receiving device exists, such that the receiving device sees the distributed data arriving as a single, uniform stream of data, even though the several transmitter sources are spatially distributed. This technique is referred to as "spot formed" data transmission, where all of the divided and distributed data may only be accessed at the "spot" (location) at which the plurality of signals overlap.

In other embodiments, in the case where there is a time difference between the transmission and reception for one or more of the respective transmission paths from the several transmitters, the present embodiments further, or alternatively, provide techniques for implementing calculated time delay parameters to coordinate the distributed data, such that the data arrives at the receiving device during an intended time period. The delay calculation may be static if there is little change in the system as a whole. In some instances, the delay parameters are calculated dynamically, and may be determined based on a number of factors, including without limitation mobility of the receiving device, fluctuations in the one or more passive or active components in the wired transmission system, environmental factors, etc.

In some embodiments, the distributed data is not only transmitted from transmission sources that are spatially diverse, but also from transmitting sources that are capable of data transmission according to different, and more complex, coordinated manners, including without limitation frequency diverse signals, channel diverse signals, polarization diverse signals, and/or other forms of orthogonal transmission. In some cases, the transmitted data is data-only. In other cases, the transmitted data includes data plus security key information for decrypting the transmitted data. In an exemplary embodiment, the present systems and methods may be further implemented to distribute portions of the security key to the coordinating transmitters. In other embodiments, the present systems and methods transmit the security key as a whole from one particular designated transmitter, or may rotate transmission of the security key as a whole among the coordinated transmitters.

In an exemplary embodiment, a universal clock is implemented with one or more of the coordination techniques described herein, and serves to more efficiently enable the cooperation and orchestration of data transmission among the plurality of transmitters. As used herein, "universal clock time," "clock," or "clock signal" therefore refer to a time that is maintained externally to the radio access network (RAN) of the wireless communication system (e.g., cable networks, cellular networks, satellite networks, etc.), and may be, for example, established with reference to one or more of: (i) a Global Positioning System (GPS); (ii) an Assisted Global Positioning System (A-GPS); (iii) a Galileo-based device or system; (iv) an Assisted Galileo (A-Galileo) device or system; (v) an Assisted Global Navigation Satellite System (A-GNSS); and (vi) another reliable clock source reference.

In the case where delay parameters are calculated, the parameters may be calculated considering known or dynamically-determined path delays between one or more of the transmitters and the receiving device, between the headend/hub and the several respective transmitters, reflections and/or obstacles along the signal path to the receiving device, traffic congestion, communication protocols, movement of the receiving device, etc.

Coordinated Data Transmission

The present systems and methods may accomplish data division among the plurality of coordinated and spatially distributed transmitters according to one or more techniques, including without limitation: (i) dividing the data into time-division data portions, and then distributing the time-division data portions among the plurality of transmitters for transmission during designated time slots; (ii) including, with the divided data, an additional security key originating from a non-data transmitting transmitter; (iii) including, with the divided data, a security key that is distributed among the plurality of transmitters (e.g., the security key may be sent to a first transmitter for transmission during a first time slot, to a second transmitter for transmission during a second time slot, etc., or the security key may be distributed randomly or pseudo-randomly among the transmitters); and (iv) including, with the divided data, a security key that is divided into security key portions for distribution to some or all of the transmitters, such that no single transmitter need transmit the entire security key.

In an exemplary embodiment, the present systems and methods are further configured to implement spot formed data transmission such that the spatially distributed transmitters are coordinated to transmit the same data at a signal strength below a determined noise floor. According to this example, a particular location may be identified where the signal strength(s) from the coordinated transmitters is above a determined noise floor, and this location therefore indicates the spot formed by the overlap of the plurality of signals therefrom. That is, at this particular spot formed by the signal overlap, the several signals add to each other, and bring the cumulative signal strength above the noise floor, thereby effectively rendering the data recoverable by the receiving device only at that spot.

In some embodiments, the data is distributed to the plurality of transmitters, and one or more of the plurality of transmitters may be further instructed to transmit the data by way of two or more bands, channels, or polarizations, and of the same radiated beam or different radiated beams. At least one embodiment, one or more of the transmitters is instructed to utilize at least one orthogonal means of transmission. The present systems and methods may be implemented for data transmissions performed optically, utilizing laser-modulation, sonically, in the radio frequency (RF) spectrum, or by other data transmission systems and techniques.

In an embodiment, the plurality of divided into distributed data portions are transmitted utilizing a coordination system configured to provide a timestamp to each data portion of the plurality of data portions. Utilization of this timestamp technique advantageously allows the system to order the plurality of data portions such that the receiving device may determine the correct order for the eventually received plurality of data portions. This technique is particularly useful in the case where delay parameters are not implemented, or in which additional unforeseen transmission delays occur, such that the data portions do not arrive at the receiving device in the intended order.

FIG. 1 is a schematic illustration of an exemplary transmission system 100. In an exemplary embodiment, system 100 represents a data transmission system for a wireless regional access network having a coordinated communication security system. In the exemplary embodiment, system 100 further includes a hub 102 configured to coordinate the data transmission, and which includes a central coordination system (CCS) 104, an RF distribution and combining system (RFDC) 106, and an optical transmission and receiving (OTR) system 108. System 100 further includes a communication network 110 (depicted as a hybrid fiber coaxial cable (HFC, or HFCC) network, in this example) configured to carry the data between hub 102 and a plurality of end points 111 (e.g., customer premises equipment (CPE)) within network 110.

In the embodiment depicted in FIG. 1, network 110 may further include one or more of a plurality of amplifiers/nodes 112 and a plurality of fiber nodes 114. Amplifiers/nodes 112 are disposed, for example, along cable (e.g., coaxial) lines 116, and fiber nodes 114 along fiber lines 118, for the optical passage of data therebetween. Network 110 further includes a plurality of taps 120, through which end points/CPEs 111, fiber nodes 114, and a plurality of transmitters (e.g., transmission-capable antennas) 122, 124, 126, 128, 130, may operably access and communicate with hub 102 over network 110. In this example, fiber nodes 114 may be further assisted by amplifiers/nodes 112 for the transmission of data across cable lines 116. For ease of explanation, some taps 120 are shown with no connections, while others are shown connected to CPEs 111 or transmitters 122-130. The person of ordinary skill in the art will understand though, that one or more of transmitters 122-130 may connect to, or be incorporated into, a single tap 120, may be a standalone device connected to one of cable lines 116, or may reside in, or be associated with, a customer home location (e.g., a CPE thereat) or another end point 111.

In exemplary operation of system 100, transmitter 122 radiates a first directional signal 132, transmitter 124 radiates a second directional signal 134, and transmitter 126 radiates a third directional signal 136. A spot 138 is formed by the overlap of signals 132-136, and a receiving device 140 is disposed within the vicinity of spot 138. In the example illustrated in FIG. 1, receiving device 140 is symbolically depicted as a generic antenna type system, but may be any device capable of wirelessly receiving data, and which is may also be capable of transmitting data (i.e., a transceiver) according to the same protocols and media in which data is received, or may perform transmission in a different manner and/or according to different protocols. The person of ordinary skill in the art will understand that the description of only three transmitters in this example is for ease of explanation, and not intended to be limiting.

In further exemplary operation of system 100, hub 102 administrates (i) the portioning of the data, (ii) the distribution of the data portions to the plurality of transmitters 122-130 (in this example, only transmitters 122, 124, 126 are described to transmit to receiving device 140), and (iii) the synchronization of the data transmissions such that each data portion arrives at receiving device 140 during a scheduled time period. In an exemplary embodiment, these functions are managed within hub 102 by CCS 104, which may further include a clock 142. In the exemplary embodiment, clock 142 is a "universal clock" configured to synchronize network 110. In some embodiments, CCS 104 determines delay values and utilizes clock 142 to augment individual data portions by the determined delay values to ensure timely reception of the data portions at receiving device 140.

In one example, CCS 104 may initially receive the original data, and then segment or apportion the original data into a number of data portions corresponding to the number of transmitters (three, in this example) being coordinated with receiving device 140 and/or spot 138. Once so segmented, CCS 104 assigns the data portions to a respective one of a first transmission path 144 from hub 102 to transmitter 122, a second transmission path 146 from hub 102 to transmitter 124, and a third transmission path 148 from hub 102 to transmitter 126. CCS 104 may then determine any delays related to each transmission path 144, 146, 148, and subsequently coordinate the cooperating respective spatially distributed transmitters 122, 124, 126 such that the data is transmitted as separate portions from transmitters 122, 124, 126, but also such that the data portions are timely received by receiving device 140 in a manner substantially matching the original data prior to segmentation.

In the example illustrated in FIG. 1, first transmission path 144 represents the transmission of a first data portion (not shown) from hub 102 to transmitter 122 by way of fiber line 118(1), fiber node 114(1), and amplifier 112(3), and then to receiving device 140 (i.e., at spot 138) from transmitter 122 by way of signal 132. Similarly, second transmission path 146 represents the transmission of a second data portion (not shown) from hub 102 to transmitter 124 by way of fiber line 118(1), fiber node 114(1), amplifier 112(1), and amplifier 112(2), and then to receiving device 140 from transmitter 124 by way of signal 134, and third transmission path 148 represents the transmission of a third data portion (not shown) from hub 102 to transmitter 126 by way of fiber line 118(2), fiber node 114(2), and amplifier 112(4), and then to receiving device 140 from transmitter 126 by way of signal 136. The person of ordinary skill in the art will understand that the first, second, or third data portions, transmitted by transmitters 122, 124, 126, respectively, may be individually detected or received by an appropriately configured receiver anywhere within the radiated beams of signals 132, 134, 136; however, in this spot formed transmission example, the original data as a whole may only be received at by a receiver at spot 138, where signals 132, 134, 136 overlap, and also coherently add to one another at spot 138, in this configuration.

The techniques described herein for coherently adding signals (see e.g., FIGS. 4-8 and 10-12, described further below) are provided by way of example, and not in a limiting sense. Other coherent signal addition techniques may be implemented with the present systems and methods without departing from the scope thereof, and would be apparent to the skilled artisan after reading the present disclosure.

In an exemplary embodiment, one of hub 102 and CCS 104 is configured to determine delays, either from network information stored in a memory, or dynamically through active measurement and/or feedback (or a hybrid technique of dynamic and stored information). In some embodiments, hub 102/CCS 104 determines delay values by analyzing the respective delay in each leg of transmission path 144, 146, or 148 (e.g., for second transmission path 146, delay values may consider the optical leg between hub 102 and fiber node 114(1), the cable leg between fiber node 114(1) and transmitter 124, and/or the wireless leg between transmitter 124 and receiving device 140), using distance and/or propagation parameter information stored in memory. In other embodiments, hub 102/CCS 104 dynamically detects or measures, in real-time, delays in one or more legs of several transmission paths of network 110, or may directly determine or measure the total delay between hub 102 and receiving device 140.

In the case where receiving device 140 is a mobile device, network 110/CCS104 may determine the static delay separately from the dynamic aspects of the delay. For example, static delay characteristics (e.g., from fiber distances, materials, etc.) of system 100 may not require frequent measurement, whereas dynamic aspects within system 100 (e.g., where receiving device 140 moves with respect to spot 138 and transmitters 122, 124, 126) may be determined or measured continuously, periodically, or in response to a triggering event (e.g., loss of communication with receiving device 140, GPS information from receiving device 140 indicating movement). In an embodiment, system 100 includes one or more static or dynamic relays, and/or static or dynamic receivers (not shown) to implement determination or measurement of the delay values. In the case where dynamic relays/receivers are utilized, system 100 may be further configured to track fluctuations in the delay of one or more legs over time, in order to reliably coordinate with respect to mobility of receiving device 140, and more effectively ensure that the data portions are received during the appropriate time period.

In an embodiment, one or more of transmitters 122-130 transmits utilizing, or compatible with, data transmission protocols including one or more of multiple-input multiple-output (MIMO), Li-Fi, laser modulation, optical communication, radiated beam forming technology, millimeter Wave, or another known data transmission capable of coordination according to the present systems and methods. As described above, more, fewer, or different types of transmitters may be utilized without departing from the scope herein.

In an exemplary embodiment, data transmission coordination functionality is centralized within hub 102. In some embodiments, some or all of the computational processing capability for coordination is located remotely from hub 102, in different components of hub 102 other than CCS 104, or in other components of system 100 that include a processor. For example, particular functional aspects, described above, of CCS 104 may reside within non-passive elements of amplifiers/nodes 112 and/or fiber nodes 114 without departing from the scope herein.

In an alternative embodiment, signals 132-136 carry substantially identical data, and each respective transmitter 122-126 transmits at a signal strength below a determined noise floor. Similar to the embodiments described above, signals 132-136 overlap at spot 138, and again coherently add to one another such that the total signal strength at spot 138 is above the determined noise floor, which renders the total signal receivable by receiving device 140 at spot 138. In this example, and as described further below with respect to FIG. 4, outside of the region of spot 138, any received data below the noise floor will be obscured by ambient noise and effectively not "readable."

Security Enhancement

The embodiments described herein assume that the transmission environment includes multiple radiated beams/signals, and that the operation of system 100 is generally controllable (e.g., by hub 102). In consideration of a system according to these assumptions, a number of additional security enhancements may be implemented according to one or more of the following examples.

In a first security enhancement example, system 100 is further configured to transmit a security key over all of the plurality of signals 132-136. In the case where signals 132-136 are all RF-focused radiated beams, signals 132-136 will add coherently, in phase, at spot 138, which is formed by the overlap thereof. Accordingly, in this example, the additionally-transmitted security key may only be accessible at spot 138, i.e., the location where all of the plurality of respective radiated beams overlap.

Further to this example, the transmission of the security key may be configured to utilize the maximum modulation and coding scheme available to system 100 in light of the transmission conditions at the time of transmission, such that each of signals 132-136 may be optimized to be high strength signals, and also maximally in-phase. By optimizing signals 132-136 in this manner, the region of reception for spot 138 may be minimized or reduced, which in turn will maximize or increase the security provided by the key transmission scheme.

For example, when receiving device 140 is mobile, and moves away from the region of reception, i.e., spot 138, receiving device 140 will perceive a precipitous reduction in signal quality from one or more of the radiated beams of signals 132-136. This reduction in signal quality will render it increasingly difficult for receiving device 140 to retrieve the security key and/or any associated data transmissions as the distance from spot 138 increases. Additionally, even relatively small locational shifts away from the reception region of spot 138 may further result in one or more of signals 132-136 being partially or completely out of phase with each other, such that the components of the different radiated beams thereof may cause destructive interference. In some embodiments, the power level of the respective radiated beams of signals 132-136 may be adjusted such that the different beams are approximately of equal strength with respect to each other within the reception region of spot 138. In this case, the technique of equalizing the strengths of the radiated beams, combined with out of phase signals, may further result in strong signal cancellation properties.

Further to this exemplary security enhancement embodiment, in the case where system 100 also implements the delay parameter techniques described above, the security key techniques may be implemented together with techniques utilizing one or more delays to facilitate the coordinated data transmission from the transmitters (e.g., transmitters 122-126) to the receiving device (e.g., receiving device 140). For example, in some instances, it may be desirable calculate only a static delay condition when transmitters 122-126 and receiving device 140 are stationary. That is, because none of the signal paths (e.g., paths 144-148) will change, dynamic calculations for the structural architecture of system 100 may not provide significant value. Nevertheless, the person of ordinary skill in the art will understand that other factors and parameters (e.g., traffic congestion, interference, etc.) may play a role in determining the desirability of whether delays beyond a static delay calculation are desirable.

The static condition delay may be represented as [S,D], and may, for example, be based on parameters including one or more of carrier frequency, coding of the elements of the transmission path, traffic along the transmission path (which may also be a factor of dynamic delay calculations), etc. In contrast, the dynamic condition delay may be based, at least in part, on the size of a data portion being transmitted. As described above, the data portions need not be distributed among the transmitters and transmission paths in equal sizes. In some embodiments, a particular data portion may further be variable in size. Both of these static and dynamic characteristics or parameters may affect the time delay calculation that associates delay values with the respective distributed data portions. Accordingly, in some embodiments, the size of a data portion distributed by CCS 104 may be based on factors including, without limitation, (i) the transmission path (e.g., lengths, hardware, etc.), (ii) the delay necessary to achieve a particular transmission scheme, (iii) a capacity of the associated transmitter receiving the distributed data portion, (iv) a format of the transmission, and (v) the capability of the receiver/receiving device.

In a second security enhancement example, system 100 is further configured to direct one of transmitters 122, 124, 126 to transmit an assigned portion of the security key using relevant hardware thereof (e.g., a remote antenna unit (RAU)) over its respective signal 132, 134, 136. In an embodiment of this enhancement example, system 100 may cause each transmitter 122, 124, 126 to suppress transmission of other portions of the security key from that are not assigned to that particular transmitter. Through this technique, system 100 may effectively segment and distribute the security key such that each portion of the distributed key is transmitted over its own independent radiated beam. In the exemplary embodiment, system 100/CCS 104 is configured to segment the security key into a number of key portions corresponding to the number of transmitters 122-126 and related signals 132-136.

After all the portions of the segmented security key are received by receiving device 140 over multiple paths 144-148 and signals 132-136, the security key may be reassembled by receiving device 140 as a single key. In some embodiments, the segmented key portions are distributed and transmitted over several different wireless paths according to the several different target transmitters and associated respective radiated beams. In other embodiments, the security key segments may be transmitted over a plurality of different media, including without limitation different frequencies, different channels, different polarizations of the same or different radiated beams, and other orthogonal means of transmission that are functionally operable on system 100.

In a third security enhancement example, system 100 is further configured to transmit the security key as a single whole key. In an exemplary embodiment of this enhancement example, the single whole key is transmitted at one time through a first radiated beam of signals 132-136, and at another time through a different radiated beam of a different signal. In some instances, CCS 104 may randomly select which of transmitters 122-126 are to receive the single whole key at a particular time, that is, which radiated beam will carry the entire security key. In other instances, CCS may select among transmitters 122-126 according to the capabilities thereof.

This exemplary scenario may be particularly useful in the case where a transmitter is not capable of carrying the relevant payload to a wireless end device. Additionally, a transmitter may, in some instances, be capable of communicating with the end device, but for reasons of capacity or other criteria, would not be a desirable choice to carry the payload information. According to the advantageous techniques of system 100 though, such an "undesirable" transmitter (payload) and corresponding radiated beam may be nevertheless still utilized to carry the single whole security key(s). In at least one embodiment, CCS 104 is further configured to assign the whole security keys to respective transmitters such that the origin of the direction and the region from which the security keys are randomized further increase the security of data transmissions within system 100.

In a fourth security enhancement example, in the case where receiving device 140 is a mobile device, system 100 may be further configured to transmit the security key according to one or more of the preceding exemplary security enhancement schemes, individually or as a hybrid combination of portions of each scheme. This hybrid combination approach may be particularly useful where the mobile device is actually moving, and it is desirable for system 100 to be further configured with adaptive capability to continuously or periodically adjust when handing off transmission to the mobile device from a first transmitter (or set of transmitters) to a second transmitter or set). In at least one embodiment, handoffs between sets of transmitters are performed where the first set of transmitters differs from the second set of transmitters by a single transmitter.

The exemplary embodiments of system 100 above are described, for purposes of illustration and not in a limiting sense, where the "intelligence" of system 100 is centralized within hub 102 and effectively located therein. The person of ordinary skill in the art though, will understand, after reading and comprehending the present disclosure, that at least some of this intelligent functionality may be distributed, namely, disposed in processing devices located closer in proximity to one or more of transmitters 122-130, fiber nodes 114, amplifiers/nodes 112, taps 120, and in some cases CPEs 111. In some embodiments, the relevant processors/ processing devices are integral to, or associated with, the respective transmitter 122-130, fiber node 114, amplifier/ node 112, tap 120, or CPE 111.

Figure 2:
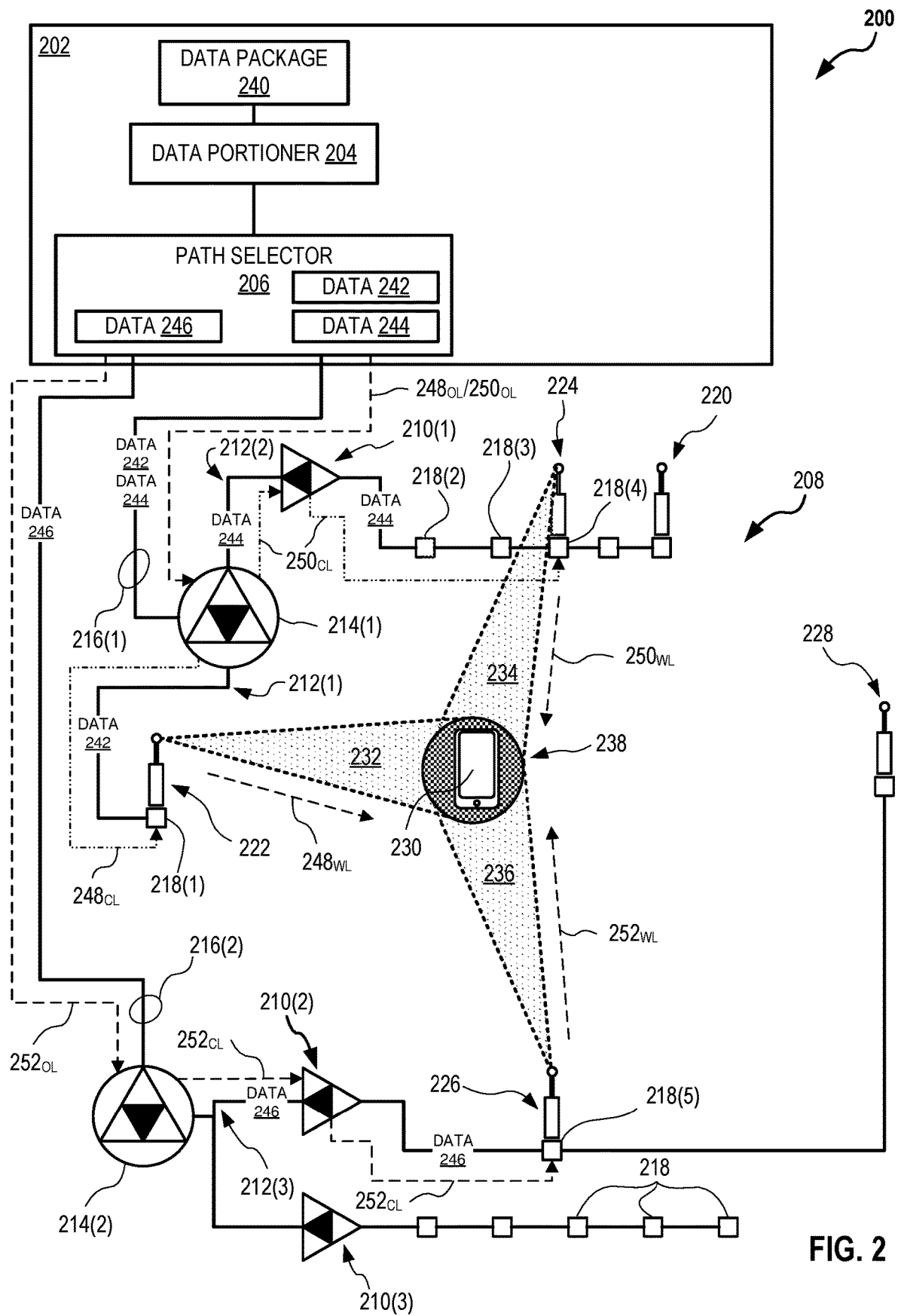

FIG. 2 is a schematic illustration of an alternative transmission system 200. In an exemplary embodiment, system 200 is similar to system 100, FIG. 1, and implementing a radiated beam-based security enhancement technique using a hub 202 having at least one data portioning unit 204 and a path selector unit 206. In some embodiments, data portioning unit 204 and path selector unit 206 are discrete hardware units, or represent dedicated processing units of a computer device or system. In other embodiments data portioning unit 204 and path selector unit 206 represent software modules stored within, and/or executed by, a processor (not shown in FIG. 2) of hub 202, or a combination of hardware and software.

In the exemplary embodiment depicted in FIG. 2, system 200 further includes a communication network 208 (e.g., HFC/HFCC) configured to carry data between hub 102 and a plurality of end points (not shown in FIG. 2) using network 208. In this example, network 208 further includes a plurality of amplifiers/nodes 210 disposed along cable lines 212, a plurality of fiber nodes 214 disposed along fiber lines 216, a plurality of taps 218, and a plurality of transmitters 220, 222, 224, 226, 228. In this example, system 200 and network 208 are described, for purposes of illustration, to also implement a three-transmitter distribution scheme to a receiving device 230 (depicted as a mobile phone/smartphone, in this example), similar to the embodiments described above with respect to FIG. 1. Accordingly, elements of network 200 that are labeled similarly to respective elements of system 100, FIG., 1, may be considered to have similar structures and/or functions thereto.

That is, similar to the functional operation of system 100, FIG. 1, system 200 functions to coordinate (i) transmitter 222 to radiate a first directional signal 232, (ii) transmitter 224 to radiate a second directional signal 234, and (iii) transmitter 226 to radiate a third directional signal 236. Similar to the example described above, a spot 238 is formed by the overlap of signals 232-236, and receiving device 230 is depicted as also being disposed within the vicinity/region of spot 238. The exemplary embodiment depicted in FIG. 2 is intended for illustrative purposes, and is not intended to represent an exhaustive representation of various elements that may be included within the present scope. That is, other components of system 100, FIG. 1, may be included in system 200, hub 202, or network 208, and/or different conventional components that are known to be used in relevant communication systems.

In exemplary operation of system 200, and also similar to the operable functionality of system 100, FIG. 1, hub 202 manages (i) portioning of data, (ii) distribution of data portions, and (iii) the synchronization of the data transmissions such that each data portion arrives at receiving device 230 during a scheduled time period. More particularly, at hub 202, data portioning unit 204 portions a data package 240 into a plurality of data portions 242, 244, 246, for distribution to the plurality of transmitters 222-228 (in this example, only transmitters 222, 224, 226 are described as transmitting to receiving device 230) by path selector unit 206. In some embodiments, data portioning unit and path selector unit 206 may form integral portions of a CCS (not shown in FIG. 2), and may operate in coordination with a clock (e.g., clock 142, FIG. 1, also not shown in FIG. 2).

In further exemplary operation of system 200, transmitters 222, 224, 226 each transmit one of data portions 242, 244, 246, respectively, to receiving device 230 in a synchronized manner utilizing respective radiated beams 232, 234, 236 overlapping at spot 260. That is, when received together data portions 242, 244, 246 collectively form a complete reception of data package 240. In the exemplary embodiment, path selector unit 206 of hub 202 is configured to determine possible transmission paths and select, for example, a number of separate transmission paths 248, 250, 252 respectively corresponding to the number of data portions 242, 244, 246 being separately transmitted (i.e., first transmission path 248, second transmission path 250, and third transmission path 252, in this example).

Similar to hub 102, FIG. 1, hub 202 is configured to calculate delays related to each transmission path 248, 250, 252, as well as to transmit data over a selected transmission path to receiving device 230 in a coordinated manner such that receiving device 230 receives a seamless transmission of data package 240 at spot 238. In an exemplary embodiment, path selector unit 206 selects a transmission path based on, but not limited to, the transmission path delay, the direction and/or speed of mobile receiving device 230, a predictive modeling of the path of travel of mobile receiving device 230, a weakest link analysis of each potential transmission path, and a best match of transmission path delays for a given transmission strategy. The transmission path delay may include one or more time delays and/or propagation delays associated with each transmission path 248, 250, 252.

In the exemplary embodiment illustrated in FIG. 2, hub 202 determines at least one delay value for each of transmission paths 248, 250, 252. Each determined delay value may, for example, include three delay components (e.g., optical leg delay, coaxial leg delay, wireless leg delay, in this example) calculated for each respective leg of that particular path. For example, for first transmission path 248, delay components may be calculated for: a first optical leg $248_{OL}$, which includes fiber line 216(1), and may also include a terminal portion of hub 202 and/or an initial portion of fiber node 214(1); a first cable leg $248_{CL}$, which includes cable lines 212(1), and may include a terminal portion of fiber node 214(1) and/or all or part of tap 218(1); and a first wireless leg $248_{WL}$, which includes transmitter 222, first directional signal 232, and receiving device 230 at spot 238. The person of ordinary skill in the art though, will understand that the number of delay components described in this embodiment, as well as the various constituent components thereof, are provided by way of example and not in a limiting sense. Systems and methods according to the present embodiments may calculate more or fewer delay components for each transmission path, and/or may include more or fewer constituent elements (e.g., fibers, cables, taps, signals, etc.) in the individual calculation for a particular leg of the respective transmission path.

Thus, according to the exemplary embodiment depicted in FIG. 2, a total delay for first transmission path 248 may be calculated as the sum of the respective delays calculated for each of first path legs $248_{OL}$, $248_{CL}$, and $248_{WL}$. It will be further understood by the person of ordinary skill in the art that the delay analysis described herein may also be performed with greater or lesser granularity, as desired and/or according to the operational conditions of system 200, without departing from the scope herein. In one non-limiting example, the calculated delay, $D[Opt]_1$, associated with first optical leg $248_{OL}$ may include a delay value, $D[FL]_1$, relating to fiber line 216(1), and another delay value, $D[OE]_1$, resulting from the transition from optical to electrical signaling occurring at the initial portion of fiber node 214(1). Accordingly, in this example the calculated delay that is associated with first optical leg $248_{OL}$ may be represented according to:

$$D[Opt]_1 = D[FL]_1 + D[OE]_1 \tag{1}$$

That is, the total delay for a given transmission path may be the sum total of sub-delays for any optical legs, a coaxial legs, and wireless legs along that path. In some instances, one or more of the delay components may be substantially static. In other instances, one or more of the delay components may be dynamic, that is, the delay resulting from that component may vary over time. For example, in the case of a dynamic embodiment, the delay value $D[FL]_1$ of fiber line 216(1) may be substantially static, whereas the delay value $D[OE]_1$ from the portion of fiber node 214(1) responsible for converting optical to electrical signaling may dynamically change over time. In some cases, this dynamic change may be predictably time-dependent. In other cases, the change may not be predictable.

One example of a predictable time-dependent delay component occurs where the delay component is "load" dependent, such as when the conversion from optical to electrical signaling at fiber node 214(1) may change from one moment to the next based on the signal load at that node. In such a case, the calculation for such a load-dependent optical leg delay $D[Opt(l)]$ may be represented, i.e., for first optical leg $248_{OL}$, according to:

$$D[Opt(l)]_1 = D[FL]_1 + D[OE(l)]_1, \tag{2}$$

which includes the load-dependent dynamic component $D[OE(l)]_1$ for fiber node 214(1), but the same static component $D[FL]_1$ for fiber line 216(1). In this example, it is contemplated that fiber line 216(1) may be less subject to variance based on the signal load than may be the electrical-to-optical conversion at fiber node 214(1).

As described above, in some embodiments, one or more individual components may be subject to temporal monitoring (e.g., measurement) to determine actual changes to the delay. In such cases, the calculation for a temporally-monitored optical leg delay $D[Opt(t)](t)$ (again, for first optical leg $248_{OL}$) may be alternatively represented according to:

$$D[Opt(t)]_1 = D[FL]_1 + D[OE(t)]_1 \tag{3}$$

From this calculation based on a temporal monitoring of the respective component (fiber node 214(1), in this example), an appropriate adjustment to the optical leg delay may be made in real-time according to actual dynamic conditions of system 200 and/or the overall operation of network 208. The immediately preceding examples are described, for ease of explanation, only for one optical leg of the network, with respect to only two components thereof. The person of ordinary skill in the art will understand that these principles may be further applied to additional components and legs of system 200 and network 208 without departing from the scope herein.

For example, other static and dynamic delays may be determined based on estimated or predictive loads, and/or on active temporal measurements throughout network 208. Such additional network delays, or sub-delays, may from one or more of a sub-delay transmitting from a particular fiber node 214 onto a connected cable line 212 (i.e., D[FNtC (t)]), a sub-delay associated with transmission over a particular cable line 212 (i.e., D[CL(t)]), sub-delays across a particular amplifier/node 210 (i.e., D[AMP(t)]) or tap 218 (i.e., D[Tap]), as well as sub-delays across or through one or more components or connections thereof.

According to this exemplary embodiment, a network delay value $D[HFCC(t)]_1$ for first transmission path 248 may be calculated for the entire HFCC network portion thereof according to:

$$D[HFCC(t)]_1 = D[FNtC(t)]_1 + D[CL(t)]_1 + D[AMP(t)]_1 + D[Tap]_1 \tag{4}$$

In this exemplary calculation of network delay across first transmission path 248, it may be noted that all sub-delays other than those associated with taps 218 are shown as being time-dependent. In alternative embodiments, one or more such additional components may considered to present more of a static delay value than a dynamic delay, or the delay variance over time of a component may be considered negligible in comparison with other more robust portions of network 208.

For further ease of explanation, only first transmission path 248 is described above in detail. The person of ordinary skill in the art will understand that network delay calculations may be similarly determined for (i) second transmission path 250, including second optical leg $250_{OL}$, second cable leg $250_{CL}$, and second wireless leg $250_{WL}$, and (ii) third transmission path 252, including third optical leg $252_{OL}$, third cable leg $252_{CL}$, and third wireless leg $252_{WL}$. It may be noted that, for the exemplary embodiment depicted in FIG. 2, individual components and path legs are not necessarily exclusive to a single transmission path. As illustrated in FIG. 2, for example, first optical leg $248_{OL}$ of first transmission path 248 and second optical leg $250_{OL}$ of second transmission path 250 are the same, whereas first cable leg $248_{CL}$ and second cable leg $250_{CL}$ differ from one another after diverging from fiber node 214(1).

Figure 3A:
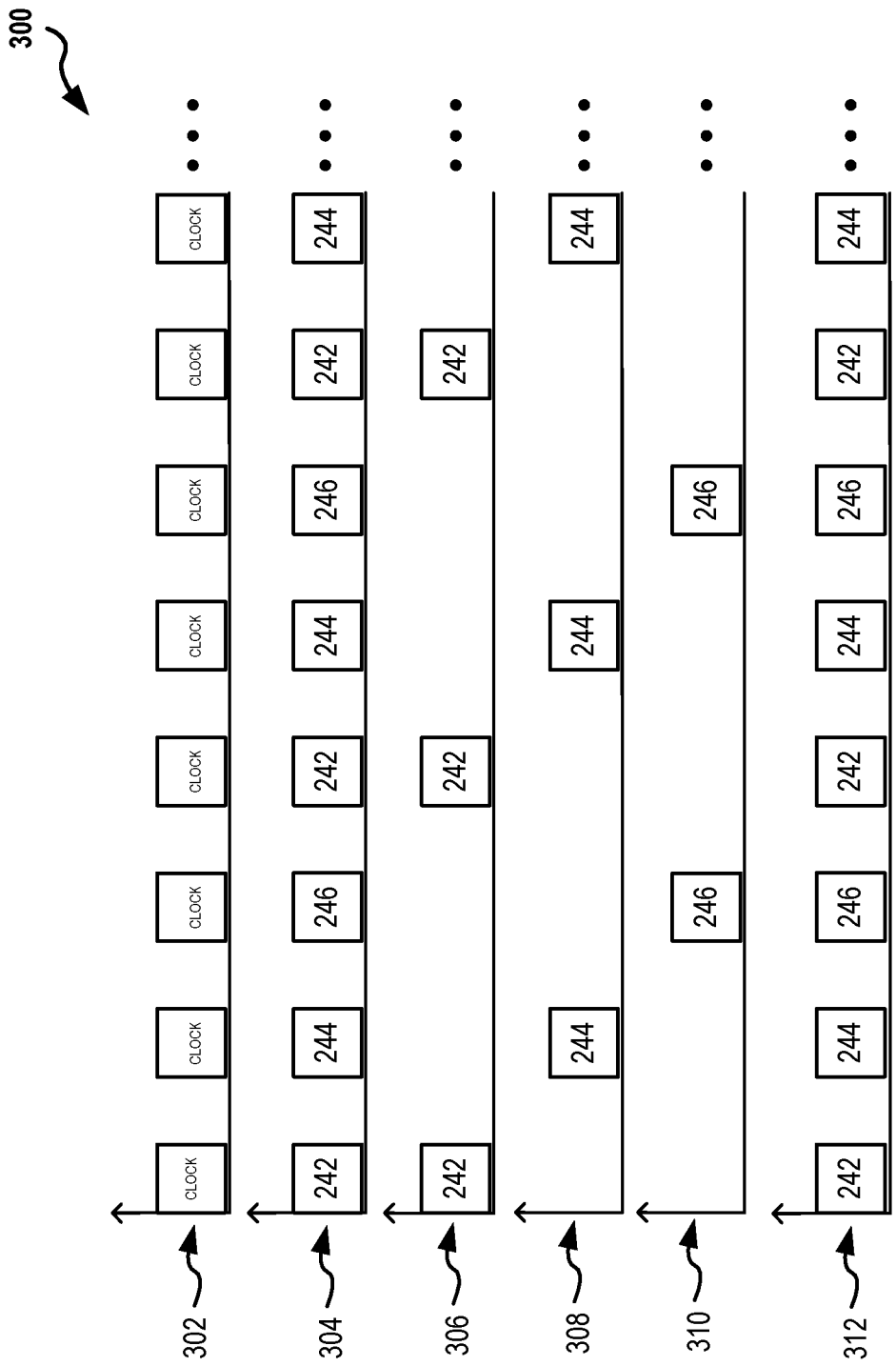
FIG. 3A depicts an exemplary data distribution timing diagram for the transmission system depicted in FIG. 2.

FIG. 3A depicts an exemplary data distribution timing diagram 300 for transmission system 200, FIG. 2. In an exemplary embodiment, timing diagram 300 implements a timing clock signal 302 from a universal synchronization clock (e.g., clock 142, FIG. 1) to facilitate data distribution and transitioning of an original trace 304 of a contiguous stream of data (e.g., portioned data package 240 from data portioning unit 204, FIG. 2) to a plurality of transmitters (e.g., transmitters 222, 224, 226, FIG. 2) for apportioned transmission to receiving device 230 in a synchronized manner utilizing respective radiated beams 232, 234, 236. In the exemplary embodiment depicted in FIG. 3A, original trace 304 includes contiguous sub-portions of first, second, and third data portions 242, 244, 246, respectively, distributed evenly and orderly in coordination with individual clock pulses of clock signal 302.

In exemplary operation of timing diagram 300, original trace 304 is apportioned (e.g., by data portioning unit 204 and a path selector unit 206, FIG. 2) into separate and distinct sub-traces for individual transmission over different respective transmission paths of network 208, FIG. 2. More particularly, and further to the exemplary embodiment described above, original trace 304 is apportioned into (i) a first sub-trace 306, which illustrates the timing sequence of the sequential sub-portions of first data portion 242 transmitted to receiving device 230 over first transmission path 248, (ii) a second sub-trace 308, which illustrates the timing sequence of the sequential sub-portions of second data portion 244 transmitted to receiving device 230 over second transmission path 250, and (iii) a third sub-trace 310, which illustrates the timing sequence of the sequential sub-portions of third data portion 246 transmitted to receiving device 230 over third transmission path 252. Accordingly, a final trace 312 illustrates the timing sequence of the reconstituted contiguous stream of transmitted data as received by receiving device 230.

In this embodiment, due to the synchronization of the separate sub-traces 306, 308, 310 with clock signal 302, receiving device 230 is able to reconstitute the separated sub-portions of data portions 242, 244, 246 into final trace 312 according to the same sequential timing order as the respective data portions were sequenced in original trace 304. For ease of explanation, the embodiment depicted in FIG. 3A is described only with respect to sequencing of data portions and sub-portions according to clock signal 302. That is, timing diagram 300 does not account for transmission delays across network 208, and final trace 312 reconstitutes individual sub-traces 306, 308, 310 at the same respective timing pulses of clock signal 302 from which they were initially apportioned according to original trace 304.

In real-world applications though, data portioning from hub 202 may not be so evenly distributed as illustrated in FIG. 3A, and transmission over the respective transmission paths will encounter delays between hub 202 and receiving device 230. Innovative examples of data portioning and transmission using intelligent delay management techniques are described further below with respect to FIGS. 3B-3C. For ease of explanation, the following descriptions of the exemplary embodiments depicted in FIGS. 3B-3C presume that the architecture of system 200, including the operational functionalities of hub 202, network 208, and receiving device 230, are the same as those described immediately above with respect to FIG. 3A, and may utilize the same timing clock signal (e.g., clock signal 302 of clock 142, FIG. 1).

Figure 3B:
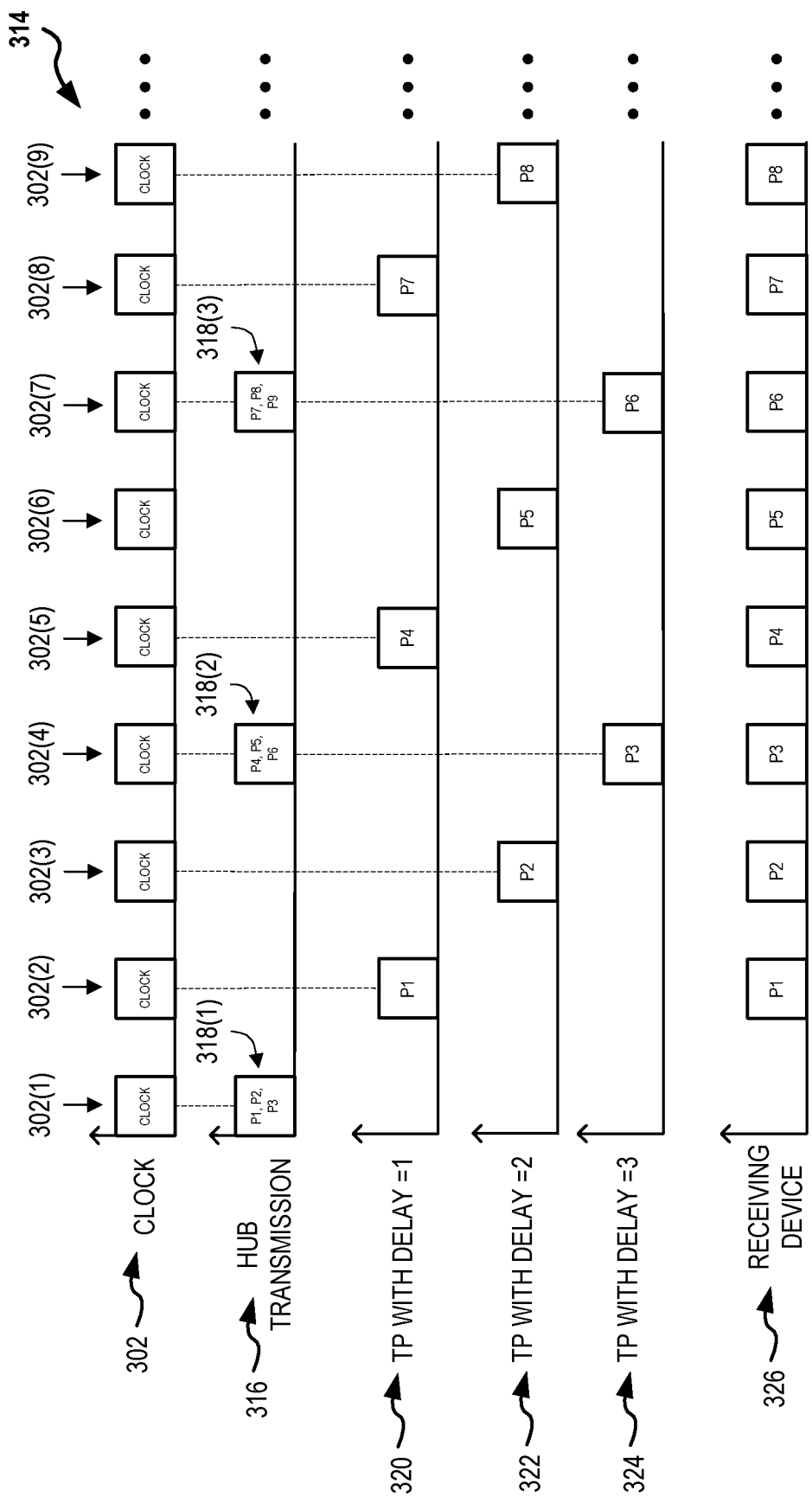
FIG. 3B depicts an alternative data distribution timing diagram for the transmission system depicted in FIG. 2.

FIG. 3B depicts an alternative data distribution timing diagram 314 for transmission system 200, FIG. 2. Similar to timing diagram 300, FIG. 3A, timing diagram 314 utilizes clock signal 302 for coordinating data distribution and transition from the plurality of transmitters. Timing diagram 314 differs though, from timing diagram 300, in that timing diagram 314 illustrates a data distribution and transmission scheme for an original trace 316 of a data package (e.g., data package 240, FIG. 2) within hub 202 portioned into a series of streamed data sub-portions P1-P9. As shown in the example depicted in FIG. 3B, data sub-portions P1-P9 (e.g., after passing through path selector 206 within hub 202) are apportioned into sequential blocks 318. More specifically, data sub-portions P1-P9 are apportioned into a first block 318(1) of data sub-portions P1-P3, a second block 318(2) of data sub-portions P4-P6, and a third block 318(3) of data sub-portions P7-P9.

In the exemplary embodiment, a processor or processing element of hub 202 determines a propagation delay or time delay for each of blocks 318(1) (i.e., P1-P3), 318(2) (i.e., P4-P6), and 318(3) (i.e., P7-P9) along separate transmission paths (e.g., transmission paths 248, 250, 252, FIG. 2). Accordingly, a first sub-trace 320 illustrates a first transmission path timing sequence of the first data sub-portion (i.e., P1, P4, P7) of each block 318, a second sub-trace 322 illustrates a second transmission path timing sequence of the second data sub-portion (i.e., P2, P5, P8) of each block 318, and a third sub-trace 324 illustrates a third transmission path timing sequence of the third data sub-portion (i.e., P3, P6, P9) of each block 318. That is, hub 202 determines: for first sub-trace 320, a time delay of one unit for the first transmission path; for second sub-trace 322, a time delay of two units for the second transmission path; and, for third sub-trace 324, a time delay of three units for the third transmission path. Therefore, in this example, first block 318(1) is transmitted from hub 202 at clock signal timing pulse 302(1), but the individual data sub-portions P1, P2, P3 thereof are traced in coordination with sequential clock signal timing pulses 302(2), 302(3), 302(4), respectively.

Thus, in an exemplary embodiment, hub 202 may further determine that second block 318(2) may be transmitted at the same clock signal 302(4) in which the last data sub-portion P3 traces over its respective transmission path. That is, hub 202 may be configured to determine delay values such that transmission of data sub-portions of one block 318, over the respective legs of separate transmission paths, do not overlap in time with leg transmission of data sub-portions of another block 318. A final trace 326 therefore depicts a reconstituted contiguous stream of the transmitted data received by receiving device 230, and according to the respective timing pulses of clock signal 302 at which the data sub-portions P1-P9 were apportioned among sub-traces 320, 322, 324.

Accordingly, as indicated by original trace 316, data sub-portions P1-P9 need not be transmitted from hub 202 in a contiguous stream, yet still be reconstituted by receiving device 230 as a sequential and contiguous data stream, as indicated by final trace 326. In other words, according to the present embodiment, even though data sub-portions P1-P9 are apportioned over separate transmission paths, the reconstituted data stream appears to receiving device 230 as though the data portions was transmitted from the same transmitter as a continuous sequential stream of data. In this example, original trace 316 apportions data sub-portions P1-P9 among blocks 318 in a sequential, but non-contiguous manner. As described further below with respect to FIG. 3C, the present systems and methods also render receiving device 230 to reconstitute a continuous data stream when the data is apportioned in a non-sequential manner.

Figure 3C:
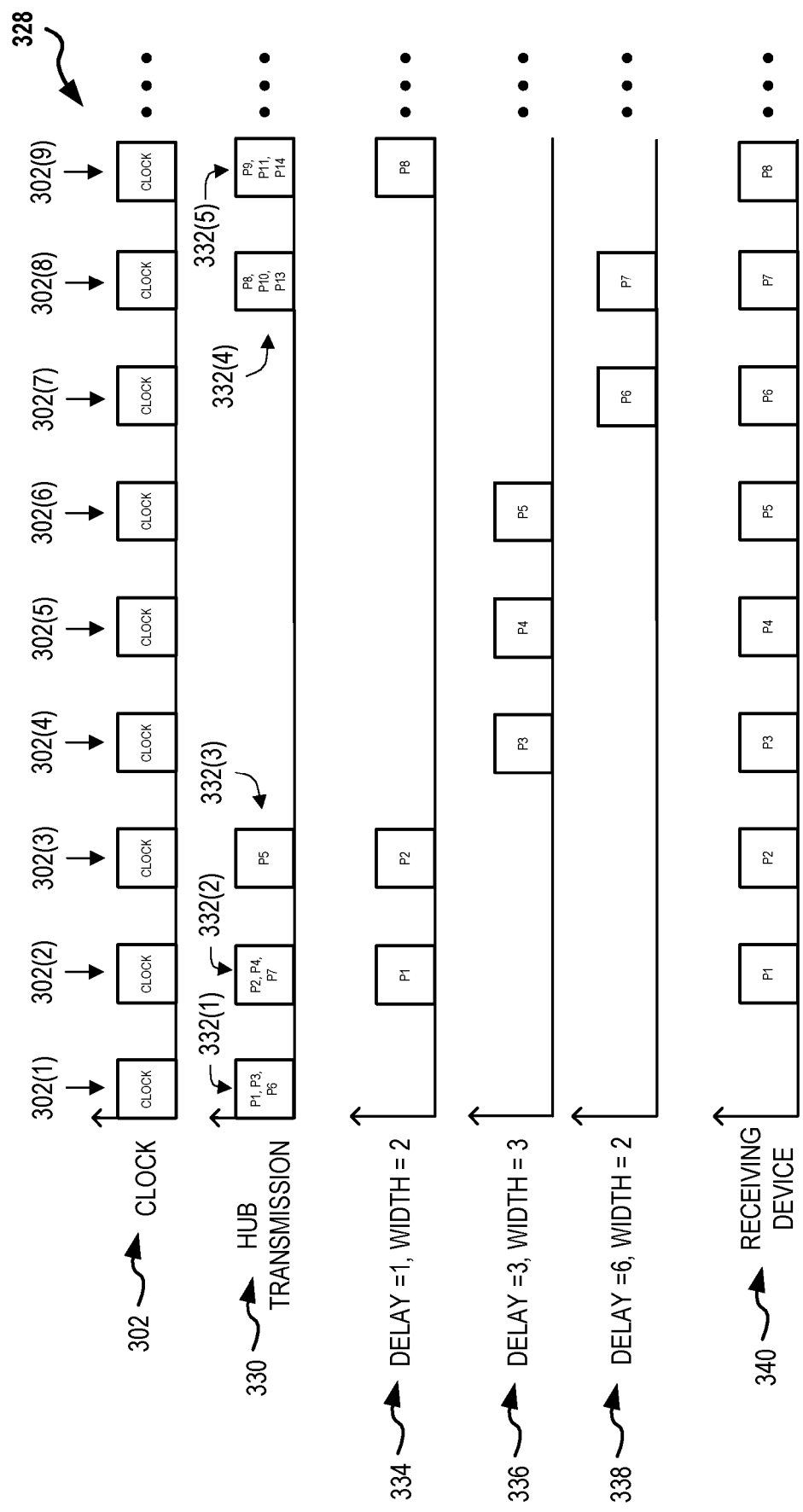
FIG. 3C depicts an alternative data distribution timing diagram for the transmission system depicted in FIG. 2.

FIG. 3C depicts an alternative data distribution timing diagram 328 for transmission system 200, FIG. 2. In the exemplary embodiment depicted in FIG. 3C, timing diagram 328 is similar to timing diagram 314, FIG. 3B, but differs in that timing diagram 328 illustrates a data distribution and transmission scheme for an original trace 330 of a data package (e.g., data package 240, FIG. 2) having series of sequential data sub-portions P1-P14, but apportioned and streamed in a non-sequential manner.

More particularly, as shown in the example depicted in FIG. 3C, hub 202 may, according to original trace 330, apportion data sub-portions P1-P14 non-sequentially among a series of blocks 332. In this example, a first block 332(1) includes data sub-portions P1, P3, P6, a second block 332(2) includes data sub-portions P2, P4, P7, a third block 332(3) includes data sub-portion P5 only, a fourth block 332(4) includes data sub-portions P8, P10, P13, a fifth block 332(5) includes data sub-portions P9, P11, P14, etc. That is, in this embodiment, data portions are distributed among the sending transmitters utilizing determined time delays, similar to the embodiment depicted in FIG. 3B, but with a variable data portion size for each block 332. In this case, hub 202 may be further, or alternatively, configured to transmit individual data sub-portions at different data widths along the respective transmission paths (e.g., determined by path selector 206) using delay values for each transmission path calculated to reconstitute the data sub-portions P1-P14 in a sequential manner at receiving device 230.

For example, first sub-trace 334 illustrates a first transmission path timing sequence of the first data sub-portion P1, P2, P8 of first, second, and fourth blocks 332(1), 332(2), 332(4), respectively, with data sub-portions P1 and P2 transmitted in a contiguous manner at a first delay value, and data sub-portion P8 transmitted along the same transmission path, and by the same first delay value, but only after transmission of intervening data sub-portions P3-P7 along different transmission paths. Thus, first sub-trace 334 represents the timing sequence of selected data sub-portions at a determined time delay of one unit for the first delay value, and a timing sequence width of two clock pulses 302 (e.g., corresponding to two contiguous data sub-portions).

In a similar manner, a second sub-trace 336 illustrates a second transmission path timing sequence of data sub-portions P3, P4, and P5 from first, second, and third blocks 332(1), 332(2), and 332(3), respectively, third sub-trace 338 illustrates a third transmission path timing sequence of data sub-portions P6 and P7 from first and second blocks 332(1) and 332(2), respectively, and final trace 340 illustrates the reconstituted data sequence at receiving device 230. In this example, the respective data sub-portions of second sub-trace 336 and third sub-trace 338 are apportioned by hub 202 according to transmission path delay values that enable the original data sequence of the data package to be reconstituted, in final trace 340, according to the initial ordering sequence of the data package, which is particularly valuable in the case where the data package represents a voice transmission. Thus, in this embodiment, second sub-trace 336 illustrates a determined time delay of three units for the second delay value, and a timing sequence width of three clock pulses 302, whereas third sub-trace 338 illustrates a determined time delay of six units for the third delay value, and a timing sequence width of two clock pulses 302.

Figure 4:
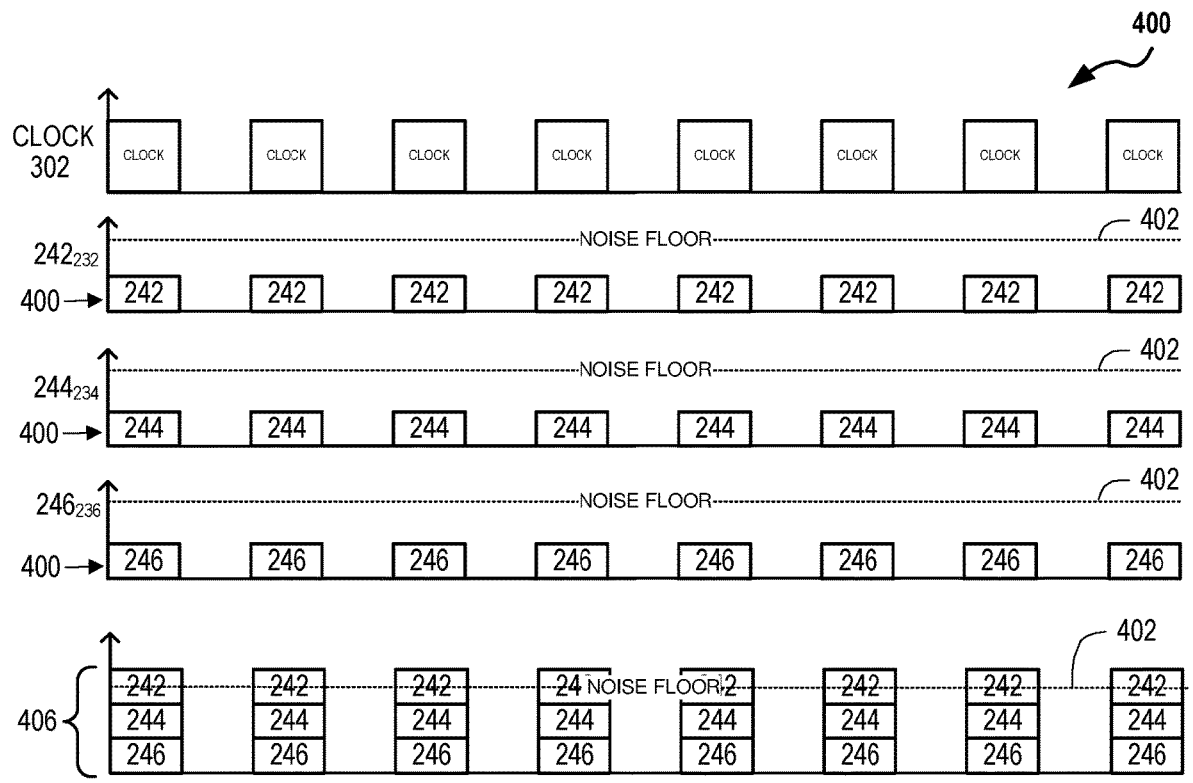

FIG. 4 illustrates a noise floor effect 400 for data distribution timing diagram 300, FIG. 3A. In the embodiment depicted in FIG. 4, noise floor effect 400 is described with respect to the separate transmissions of first data portion 242, second data portion 244, and third data portion 246 over first directional signal 232, second directional signal 234, and third directional signal 236, respectively, FIG. 2. In an exemplary embodiment, data portions 242, 244, 246 are individually transmitted simultaneously from each of respective transmitters 222, 224, 226 below a noise floor 402 such that an individual signal strength 404 of the respective transmitter is below noise floor 402, but that an additive signal strength 406 at spot 238 of all transmitted signals 232, 234, 236 is above noise floor 402.

In the exemplary embodiment, individual transmissions to 32, 234, 236 from respective spatially distributed transmitters 222, 224, 226 may be coordinated by hub 202 such that the cumulative signal strength 406 only surpasses noise floor 402 at spot 238, where all of the individual transmissions overlap. In this manner, only a device within the target region of spot 238 would be capable of receiving the reconstituted data package 240 from the various transmitters, since individual data portions may be difficult, if not impossible, to receive by conventional receiving devices outside of spot 238 due to the fact that signal strength of the individual separate transmissions would likely be undetectable from noise. In contrast, at spot 238, the cumulative signal strength 406 of radiated beams 232, 234, 236 is additive, and is configured in this embodiment such that only the collective signal strength 406 of all three beams 232, 234, 236 reaches a level above noise floor 402. That is, receiving device 230, being positioned in spot 238, is advantageously able to readily receive the entirety of the data sent over the several radiated beams 232, 234, 236 due to the additive nature of the respective individual signals, while other receiving devices are more effectively restricted from intercepting the individual signal portions.

Figure 5:
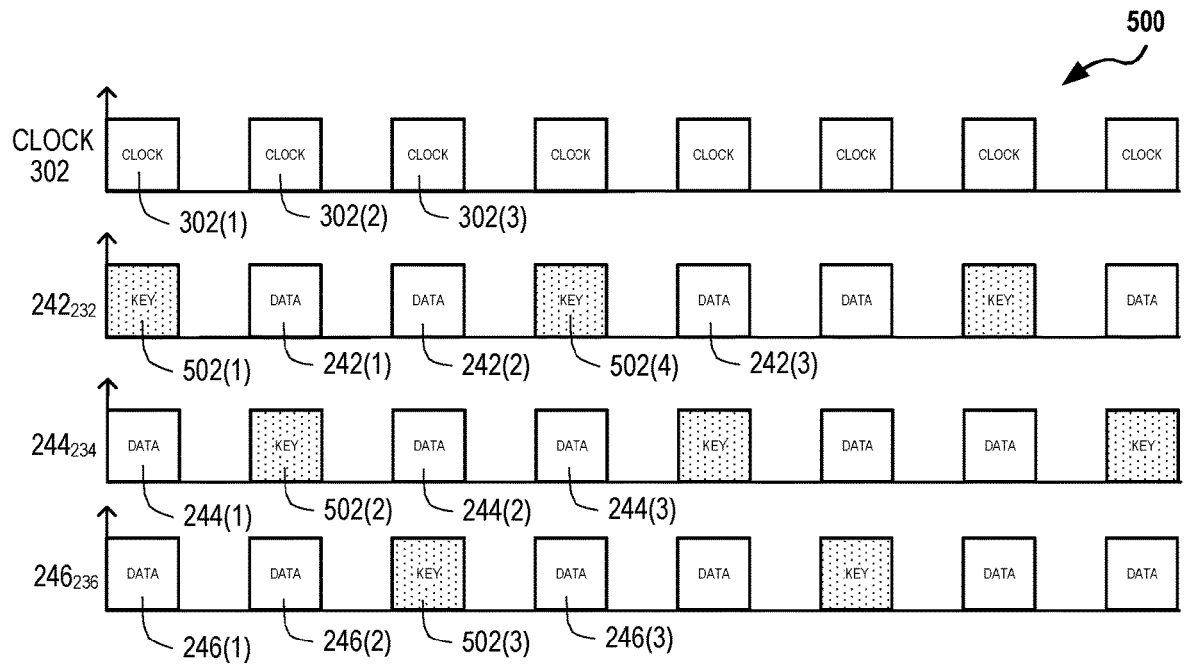

FIG. 5 illustrates a data timing diagram 500 utilizing a rotating security key 502, which may be implemented for transmission system 200, FIG. 2. In this example, for ease of explanation data timing diagram 500 is depicted as a stand-alone embodiment with respect to data portions 242, 244, 246. The person of ordinary skill in the art though, will understand that the principles described for data timing diagram 500 and security key 502 may be implemented in a complementary fashion with respect to one or more of the data distribution and timing diagram schemes described above.

In an exemplary embodiment, data timing diagram 500 utilizes universal clock signal 302 to coordinate data distribution to spatially distributed transmitters 222, 224, and 226, FIG. 2, similar to the embodiments described above. Different from the above embodiments though, according to timing diagram 500, security key 502 is distributed, on a rotational basis, among and between transmitters 222, 224, 226. More particularly, hub 2020 may be further configured to distribute portions of security key 502 such that the portions are timed to alternate from respective transmitters 222, 224, 226, over beams 232, 234, 236, to be received by receiving device 230 at spot 238.

In one exemplary operation of timing diagram 500, during first clock pulse period 302(1), a first portion 502(1) of security key 502 is transmitted to receiving device 230 using beam 232, while respective data sub-portions 244(1) and 246(1) of data portions 244 and 246 are simultaneously transmitted using beams 234 and 236, respectively. In some embodiments, first security key portion 502(1) includes only a first portion of security key 502. In other embodiments, first security key portion 502(1) includes the entirety of security key 502.

In further operation of timing diagram 500, during second clock period 302(2), a second security key portion 502(2) is transmitted using radiated beam 234, while data sub-portions 242(1), 246(2) are transmitted using radiated beams 232, 236, respectively. Similarly, during third clock period 302(3), a third security key portion 502(3) is transmitted over beam 236 while data sub-portions 242(2), 244(2) are transmitted using radiated beams 232, 234, respectively. Thus, during subsequent periods/pulses of clock 302, further portions of security key 502 are continually transmitted according to this schedule alternately over the respective radiated beams 232, 234, 236. In the case where an individual security key portion represents the entirety of security key 502, the entire security key will be transmitted at each alternating clock pulse and transmission path. In the case where a security key portion represents only part of the security key, subsequent alternating security key sub-portions may be distributed in order, sequentially, over the alternating transmission paths. For ease of explanation, path delays are not described with respect to this example, but may be accounted for according to the above embodiments.

Figure 6:
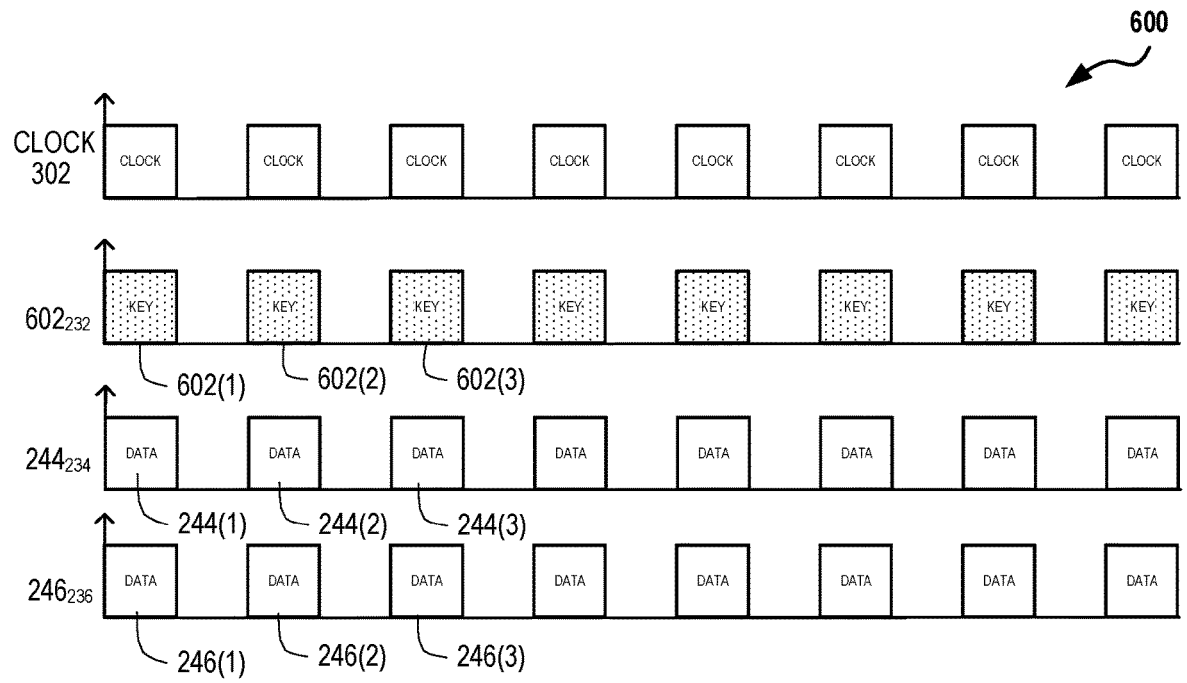

FIG. 6 illustrates an alternative data timing diagram 600 utilizing a single-path security key 602. Timing diagram 600 is similar to timing diagram 500, FIG. 5, with respect to the transmission of sequential portions of security key 602 over transmission system 200, FIG. 2, using clock signal 302, FIG. 3A. Timing diagram 600 differs though, from timing diagram 500, in that security key 602 is transmitted over a single transmission path (first transmission path 248, FIG. 2, in this example), and from a single transmitter (transmitter 222, in this example). More particularly, in exemplary operation of timing diagram 600, single-path security key 602 may be transmitted using only first being 232, whereas respective data portions (that is, data portions 244, 246, in this example) may be transmitted using beams 234 236.

In an exemplary embodiment, hub 202 and/or path selector 206 may be configured to implement a random, or pseudo-random, generator to facilitate the selection of the single transmitter/radiated beam transmission path that transmits portions of security key 602 at each period/pulse of clock signal 302. In some cases, the path selection by the random generator is influenced by one or more various inputs or measurements from hub 202 or other components of transmission system 200. For example, the transmission path selection in this embodiment may be based on, but not limited to, transmission path delay(s), direction and speed of a mobile receiving device (e.g., receiving device 230), predictive modeling of the mobile path of travel of the receiving device, a weakest link analysis of each transmission path of system 200, and a best match of transmission path delays for a given transmission strategy.

For ease of explanation, timing diagram 600 is described only with respect to the three exemplary data portions 242, 244, 246 of the embodiments described above (i.e., in this example, first data portion 242 is dedicated to single-path security key 602). The person of ordinary skill in the art though, will understand that, according to the embodiments described herein, data package 240 may be distributed into a greater number of data portions, and transmitted over additional respective transmission paths and transmitters.

Figure 7:
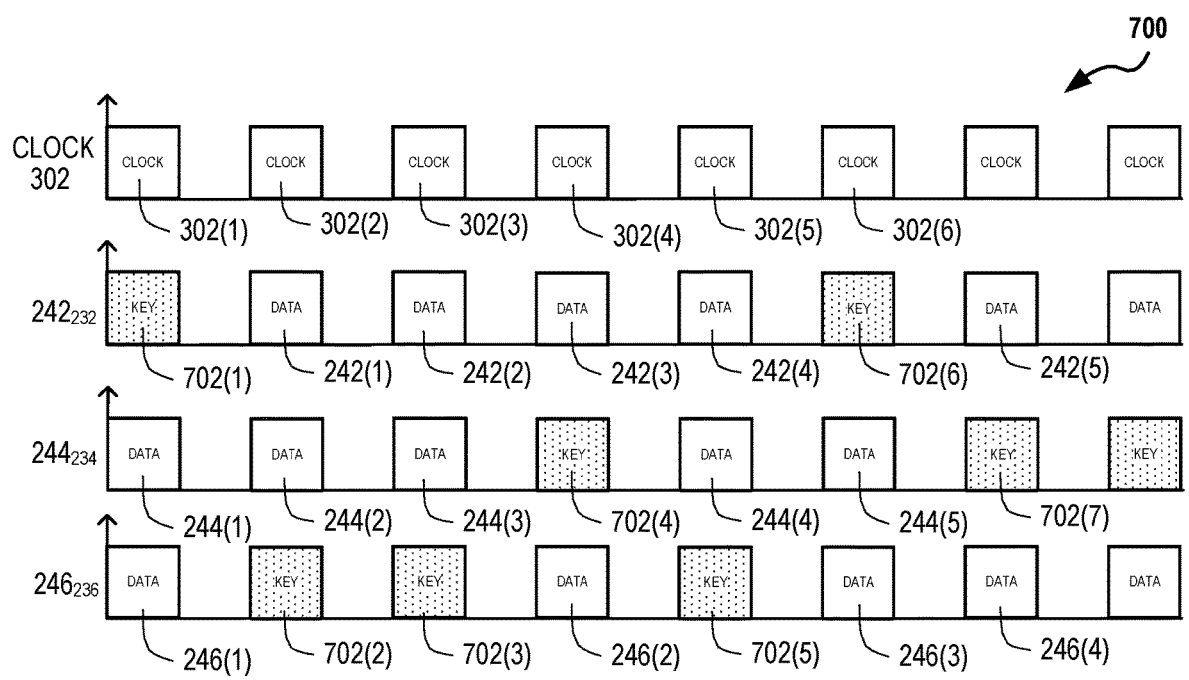

FIG. 7 illustrates an alternative data timing diagram 700 utilizing a random security key 702. Timing diagram 700 is similar to timing diagram 500, FIG. 5, with respect to the transmission of sequential portions of security key 702 over multiple transmission paths of transmission system 200, FIG. 2, but differs in that hub 202 and/or path selector 206 distribute the sequential portions of security key 702 randomly (e.g., using a random or pseudo-random generator) between the respective transmission paths and transmitters, as opposed to the regular, alternating cycle of key distribution illustrated in the embodiment depicted in FIG. 5.

In exemplary operation of timing diagram 700, during first clock period 302(1), a first portion 702(1) of random security key 702 is transmitted over first beam 232 (i.e., from transmitter 222, while data sub-portions 244(1), 246(1) are transmitted simultaneously over second and third beams 234, 236, respectively. Similarly, during second clock period 302(2), a second security key portion 702(2) is transmitted over third beam 236, while data sub-portions 242(1), 244(2) are transmitted over first and second beams 232, 234, respectively. During third clock period 302(2), a third security key portion 702(3) is also transmitted over third beam 236, but while data sub-portions 242(2), 244(3) are transmitted over first and second beams 232, 234, respectively. Portions of random security key 702 are further distributed such that, during a fourth clock period 302(4), a fourth security key portion 702(4) is transmitted over second beam 234, while data sub-portions 242(3), 246(2) are transmitted over first and third beams 232, 236, respectively. Data and security key transmission may then continue in this random manner until hub 202 and/or path selector 206 selects a different transmission scheme.

Figure 8:
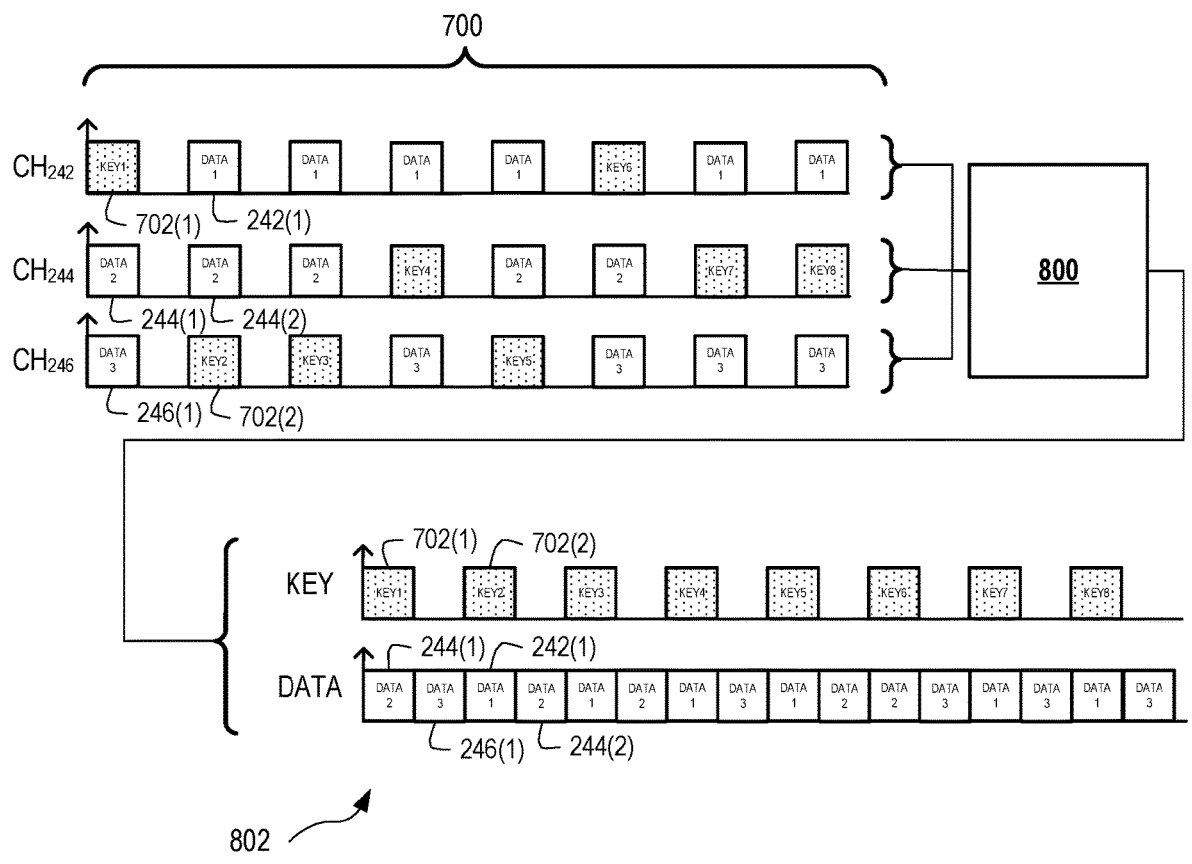

FIG. 8 is a schematic illustration depicting an exemplary security key recombination subsystem 800. In the embodiment depicted in FIG. 8, recombination subsystem 800 depicted with respect to transmission and distribution of random security key 702 according to data timing diagram 700, FIG. 7. The person of ordinary skill in the art though, will recognize that recombination subsystem 800 may be implemented at receiving device 230 or any of the security key apportionment and distribution schemes described herein (e.g., data timing diagrams 500, FIG. 5, and 600, FIG. 6).

In exemplary operation, recombination subsystem 800 is disposed within receiving device 230, or a processing element operable communication therewith, and receives sequential security key portions and data sub-portions transmitted from the several spatially distributed transmitters 222, 224, 226 and respective radiated beams 232, 234, 236. In an exemplary embodiment, recombination subsystem 800 appends, in a reconfigured data structure 802, each data block or data sub-portion in the order in which they are received at receiving device 230, such that each data block/sub-portion may be contiguously recombined in the order in which the data portions are received. In the exemplary embodiment, reconfigured data structure 802 organizes individual portions of security key 702 together with the respective sub-portions of data portions 242, 244, 246 transmitted within the same period/pulse of clock signal 302 in which the individual security key portion was transmitted.

It may be noted that, according to this example, the order of recombination may not be the same order in the respective data sub-portions were originally received at hub 202 as data package 240 (e.g., from transmission delays). In such instances, recombination subsystem 800 may further process the received data to reorder the individual sub-portions based on, for example, a timestamp, such that the order in which the data portions/sub-portions are received at receiving device 230 is rearranged to correspond to the original sequence of data sub-portions from hub 202. Accordingly, implementation of universal clock 142 and clock signal 302 enables transmission system 200 to reliably recombine the data and security key portions in the intended order for deceiving device 230 to securely receive the data according to the original sequence of data portions within data package 240.

Figure 9:
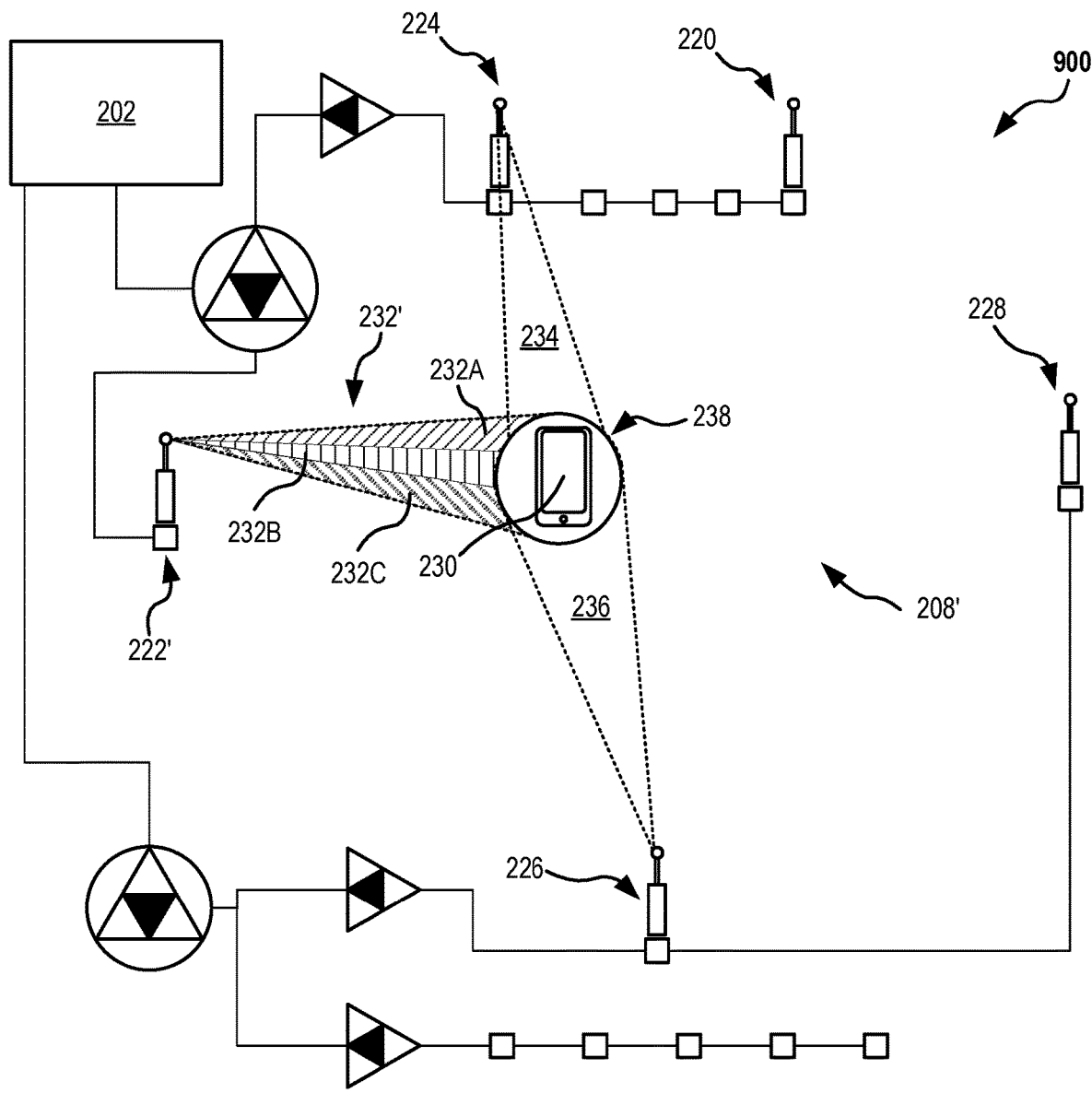

FIG. 9 is a schematic illustration of an exemplary MIMO data transmission system 900. In an exemplary embodiment, transmission system 900 is structurally and functionally similar to transmission system 200, FIG. 2, and analogous elements thereof are therefore labeled and numbered similarly. Transmission system 900 differs from transmission system 200 though, in that transmission system 900 includes at least one MIMO transmitter (transmitter 222', in this example) within network 208. Accordingly, transmission system 900 represents an example of transmission system 200 utilizing MIMO techniques.

More particularly, as depicted in FIG. 9, MIMO transmitter 222' is pictorially illustrated to be configured for data transmission utilizing a plurality of transmission antennas (not separately shown). Further to this embodiment, receiving device 230 is similarly configured to include one or more receiving antennas (also not individually shown) capable of receiving the respective signals from the antennas of MIMO transmitter 222'. Thus, in this example, MIMO transmitter 222' is configured to transmit signal 232 as three distinct sub-signals 232A-C using a corresponding number of transmitting antennas. Three sub-signals are described in this example for ease of explanation. Individual transmission beams may be transmitted as more or fewer sub-signals, and using more or fewer respective antennas.

Through this implementation of multiple transmit and receive antennas, the capacity of the radio link of MIMO transmitter 222' is multiplied. In some embodiments, some or all of the beams of sub-signals 232A-C may overlap and/or have the same coverage area. In other embodiments, sub-signals 232A-C have different respective coverage areas. Accordingly, in this example, "MIMO" specifically refers to the technique for sending and receiving more than one data signal simultaneously over the same radio channel through the exploitation of multipath propagation. Further to this example, this propagation technique may be described into three main categories: (1) precoding; (2) spatial multiplexing (SM); and (3) diversity coding.

In this embodiment, "precoding" refers to the technique of multi-stream beamforming where all spatial processing occurs at the transmitter. For beamforming techniques such as single-stream beamforming, the same signal is emitted from each of the transmit antennas with appropriate phase and gain weighting such that the signal power is maximized at the receiver input. Thus, through utilization of beamforming, the received signal gain is increased through the constructive addition of sub-signals 232A-C, emitted from different respective MIMO antennas. In an exemplary embodiment, beamforming using line-of-sight propagation may result in a more substantially well-defined directional pattern.

Also in this embodiment, "spatial multiplexing" refers to the MIMO antenna configuration of transmitter 222' that implements spatial multiplexing, and in which a high-rate signal (e.g., signal 232) is split into multiple lower-rate streams (e.g., sub-signals 232A-C), where each such lower-rate stream is transmitted from a different respective transmit antenna of transmitter 222' in the same frequency channel. In an exemplary embodiment, sub-signals arrive at the receiver antenna array of receiving device 230 with sufficiently different spatial signatures. Receiving device 230 is correspondingly configured to sufficiently determine accurate channel state information (CSI) such that the separate sub-signals may be streamed into substantially parallel channels.

As used herein, the CSI references the known channel properties of a communication link describing the propagation of a signal/sub-signal from the transmitter to the receiver, and which may represent the combined effect of, for example, scattering, fading, and power decay over distance. This implementation of spatial multiplexing therefore provides a significantly advantageous technique for increasing the channel capacity, and particularly with respect to channels having higher signal-to-noise ratios (SNRs). In an embodiment, the number of spatial streams into which the respective transmitted signal (e.g., signal 232, in this example) may be restricted according to the lesser of the number of antennas at the transmitter or receiver. Accordingly, processing hardware and/or software at hub 202 may be further configured to determine the number of transmitter and receiver antennas prior to subdivision of a transmitted signal at the respective MIMO transmitter.

Still further to this embodiment, "diversity coding" refers to the propagation category that is used in the case where the respective MIMO transmitter does not have, or is unable to obtain knowledge of, the channel. Through implementation of diversity coding techniques, a single stream may be transmitted, but with the signal thereof coded using space-time coding techniques. The resultant coded signal may then be emitted from each of the transmit antennas with full or near orthogonal coding. This implementation of diversity coding thus exploits independent fading in the multiple antenna links to enhance signal diversity. Since, in this case, MIMO transmitter 222' has no channel knowledge, no beamforming or array gain will result from diversity coding. In some cases, these diversity coding techniques may be implemented in combination with the spatial multiplexing described herein, such as in the case where some channel knowledge is available at the transmitter.

Figure 10:
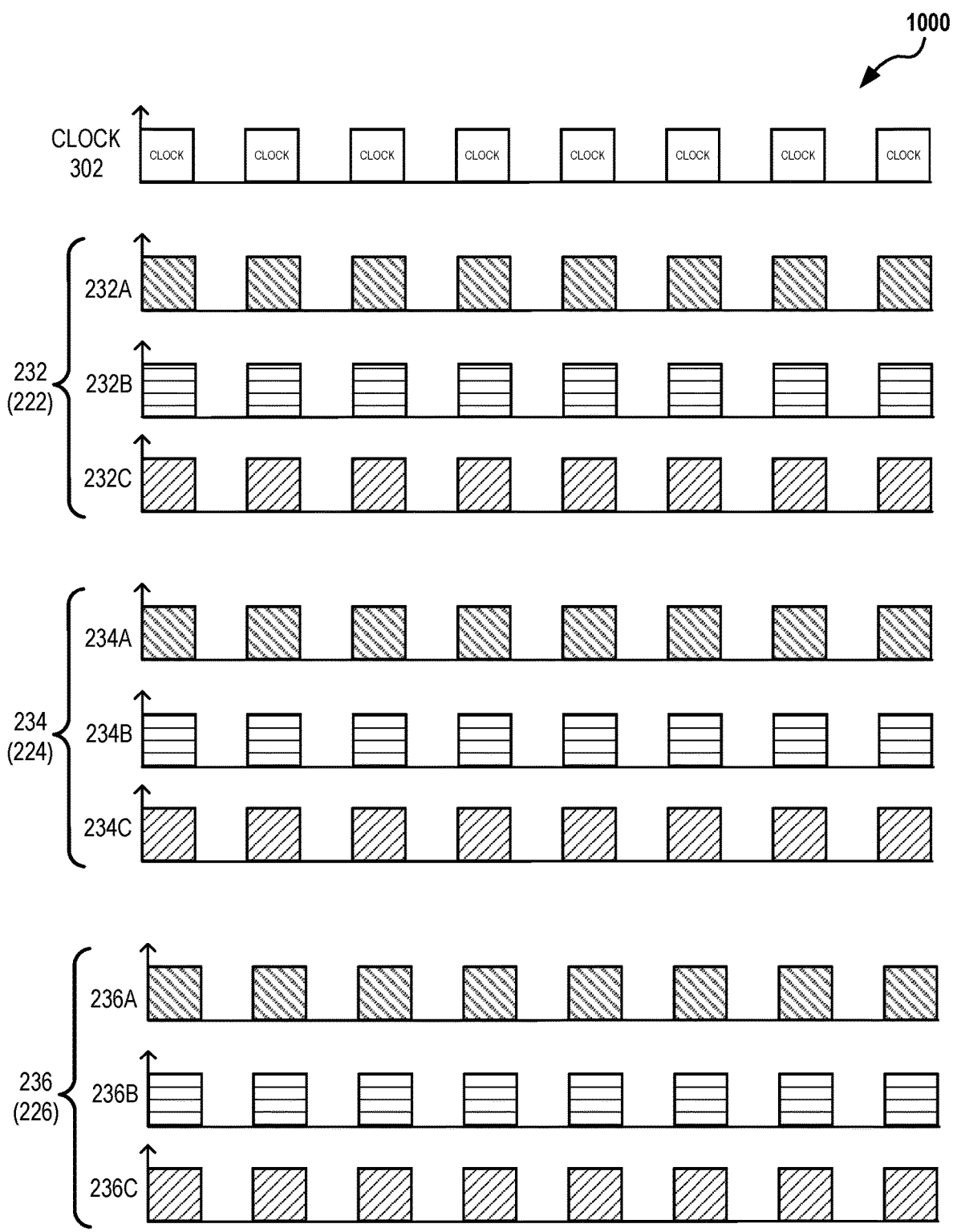

FIG. 10 depicts an exemplary data distribution timing diagram 1000 for transmission system 900, FIG. 9. For the exemplary embodiment depicted in FIG. 10, each of the spatially distributed transmitters is configured for MIMO transmission (i.e., as MIMO transmitters 222', 224', 226', respectively) and separation of the radiated beam signal thereof into separate MIMO sub-signals. More particularly, MIMO transmitter 222' transmits signal 232 into three separate sub-signals 232A-C, using at least three distinct MIMO antennas four transmitter 222', as depicted in FIG. 9. In a similar manner, MIMO transmitter 224' transmits signal 234 into three separate sub-signals 234A-C and MIMO transmitter 226' transmits signal 236 into three separate sub-signals 236A-C. Accordingly, in the exemplary embodiment, the data distribution and multiple path transmission may be exponentially multiplied through use of MIMO in coordination with regular timing pulses/periods of clock signal 302.

Figure 11:
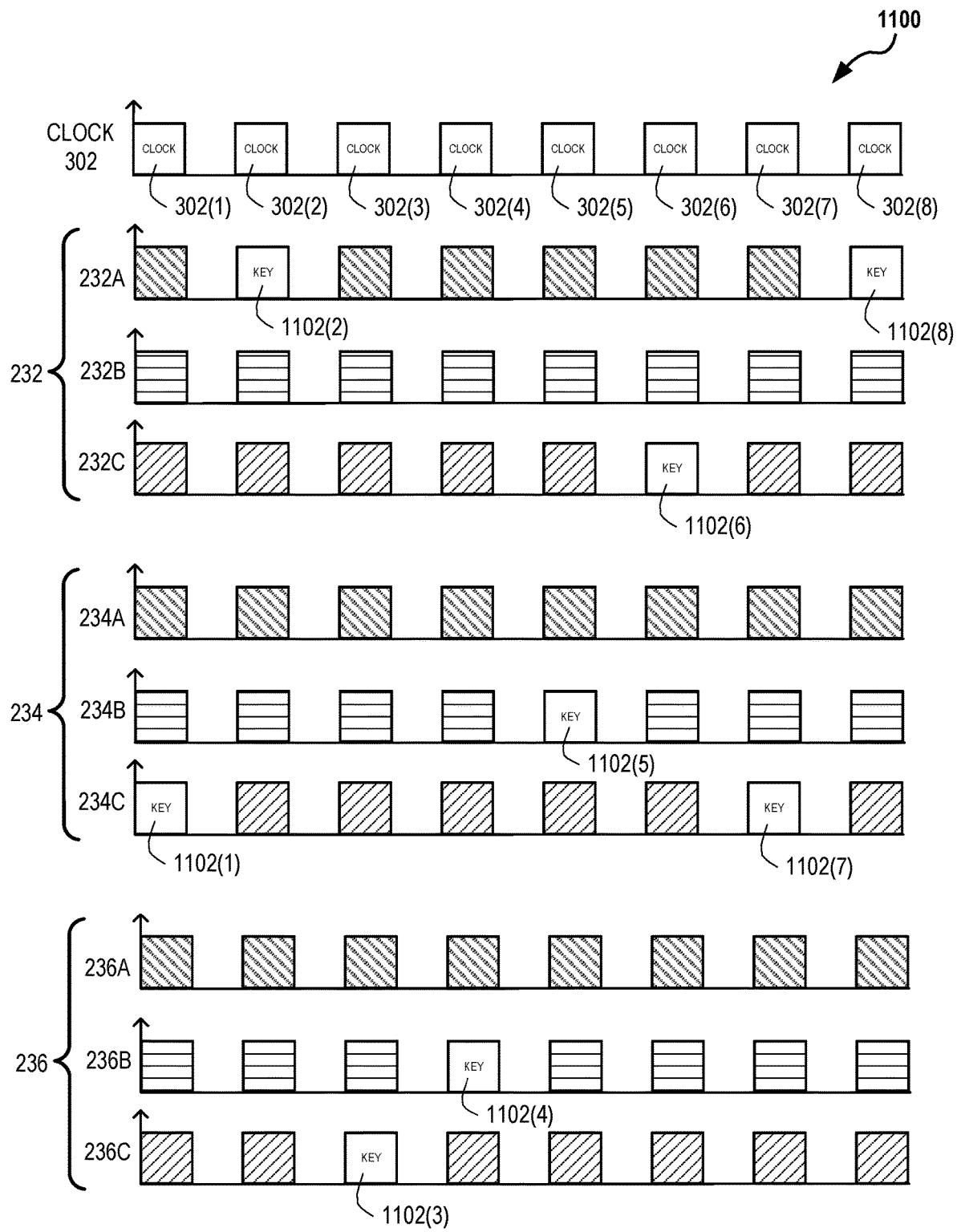

FIG. 11 depicts an alternative data distribution timing diagram 1100 for transmission system 900, FIG. 9. Timing diagram 1100 is similar to timing diagram 1000, FIG. 10, except that a security key 1102 is distributed according to a substantially random basis among the several MIMO transmission sub-signals 232A-C, 234A-C, 236A-C. That is, a first security key sub-portion 1102(1) coincides with first clock pulse/period 302(1) within third sub-signal 234C of second signal 234, a second security key sub-portion 1102(2) coincides with second clock pulse/period 302(2) within third sub-signal 234C of second signal 234, a third security key sub-portion 1102(3) coincides with third clock pulse/period 302(3) within third sub-signal 236C of third signal 236. Remaining portions of security key 1102 are distributed as shown in the accompanying illustration depicted in FIG. 11, which represents a substantially random distribution.

Figure 12:
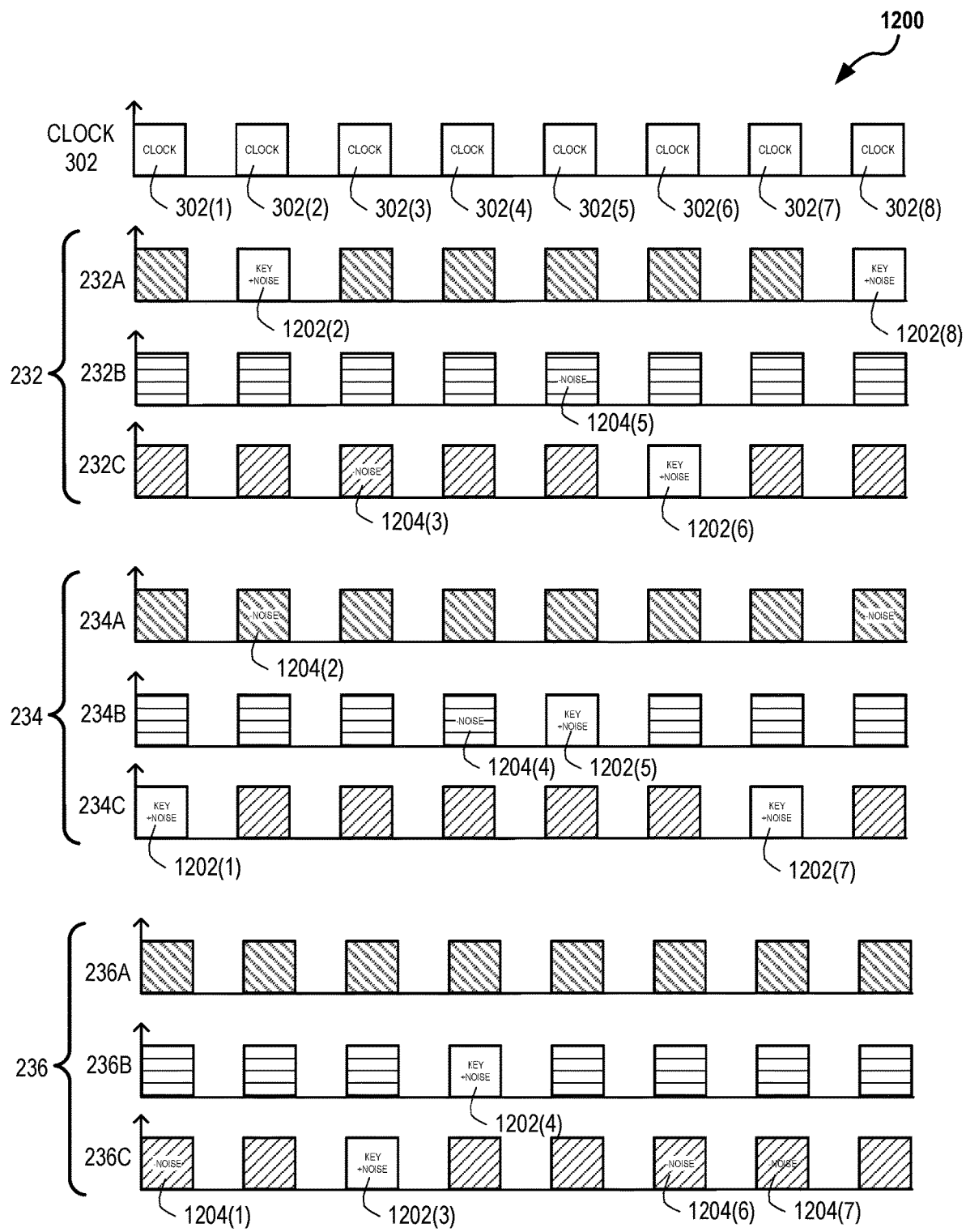

FIG. 12 depicts an alternative data distribution timing diagram 1200 for transmission system 900, FIG. 9, as modified according to timing diagram 1100, FIG. 11, and further modified. Timing diagram 1100 is similar to timing diagram 1000, FIG. 10, except that a security key 1102 is distributed according to a substantially random basis among the several MIMO transmission sub-signals 232A-C, 234A-C, 236A-C.

FIG. 12 represents a timing diagram 1200 similar to timing diagram 1100 (shown in FIG. 11), and is transmitted according to clock signal 302 on respective sub-signals 232A-C, 234A-C, 236A-C. Timing diagram 1200 differs from timing diagram 1100 though, in that timing diagram 1200 transmits a security key 1202 that includes noise on the respective security key portions, and also one or more noise canceling blocks 1204. In the exemplary embodiment, at least one noise canceling block 1204 is transmitted within the same pulse/period of clock signal 302 as a respective portion of security key 1202, but by a different transmitter, such that where the respective radiated beams/sub-signals carrying security key portion-plus-noise 1202 and noise canceling block 1204 overlap (e.g., at the spot 238), the noise of the channel including the security key may be sufficiently cancelled at the receiver (e.g., receiving device 230) within that period of clock signal 302.

More particularly, in exemplary operation of timing diagram 1200, during first clock period/pulse 302(1), third sub-signal 234C of second signal 234 is selected to transmit first security key portion 1202(1), which includes a positive noise component, whereas third sub-signal 236C of third signal 236 is selected to transmit first noise canceling block 1204(1), which constitutes a negative noise component that is configured to approximately cancel the respective positive noise component of first security key portion 1202(1), that is, for both noise components being transmitted within a time stamp of first clock period/pulse 302(1) of clock signal 302.

In further operation of timing diagram 1200, during second clock period 302(2), first sub-signal 232A of first signal 232 is selected to transmit second security key portion 1202(2), which includes a respective positive noise component, and first sub-signal 234A of second signal 234 is selected to transmit the corresponding negative noise component in noise canceling block 1204(2). In a similar manner, during third clock period 302(3), third sub-signal 236C of third signal 236 carries third security key portion 1202(3), and third sub-signal 232A of first signal 232 carries third noise canceling block 1204(3) having the negative noise component configured to cancel the positive noise component transmitted with security key portion 1202(3).

In the exemplary embodiment depicted in FIG. 12, this transmission scheme continues during subsequent clock periods 302(4)-302(8) such that subsequent security key portions 1202(4)-1202(8) and noise canceling blocks 1204(4)-1204(8) are respectively transmitted among transmitters 222, 224, 226 and radiated beams 232A-C, 234A-C, 236A-C, such that the positive noise component of each security key portion 1202 may be canceled by a corresponding negative noise component is canceling block 1204 during that period of signal 302. In the exemplary embodiment, the particular sub-channel for carrying a security key portion 1202 is selected randomly. In some embodiments though, the sub-signal selection may be according to an ordered scheme. As also depicted in FIG. 12, sub-signal assignment of noise canceling blocks 1204 is performed such that both of the security key portion 1202 and noise canceling block 1204 are transmitted on the same channel of the different respective signals (third sub-signals 234A/236A of second signal 234/third signal 236, respectively). The person of ordinary skill in the art, however, will understand that the respective sub-signals may be selected and assigned differently, without departing from the scope herein.

Figure 13:
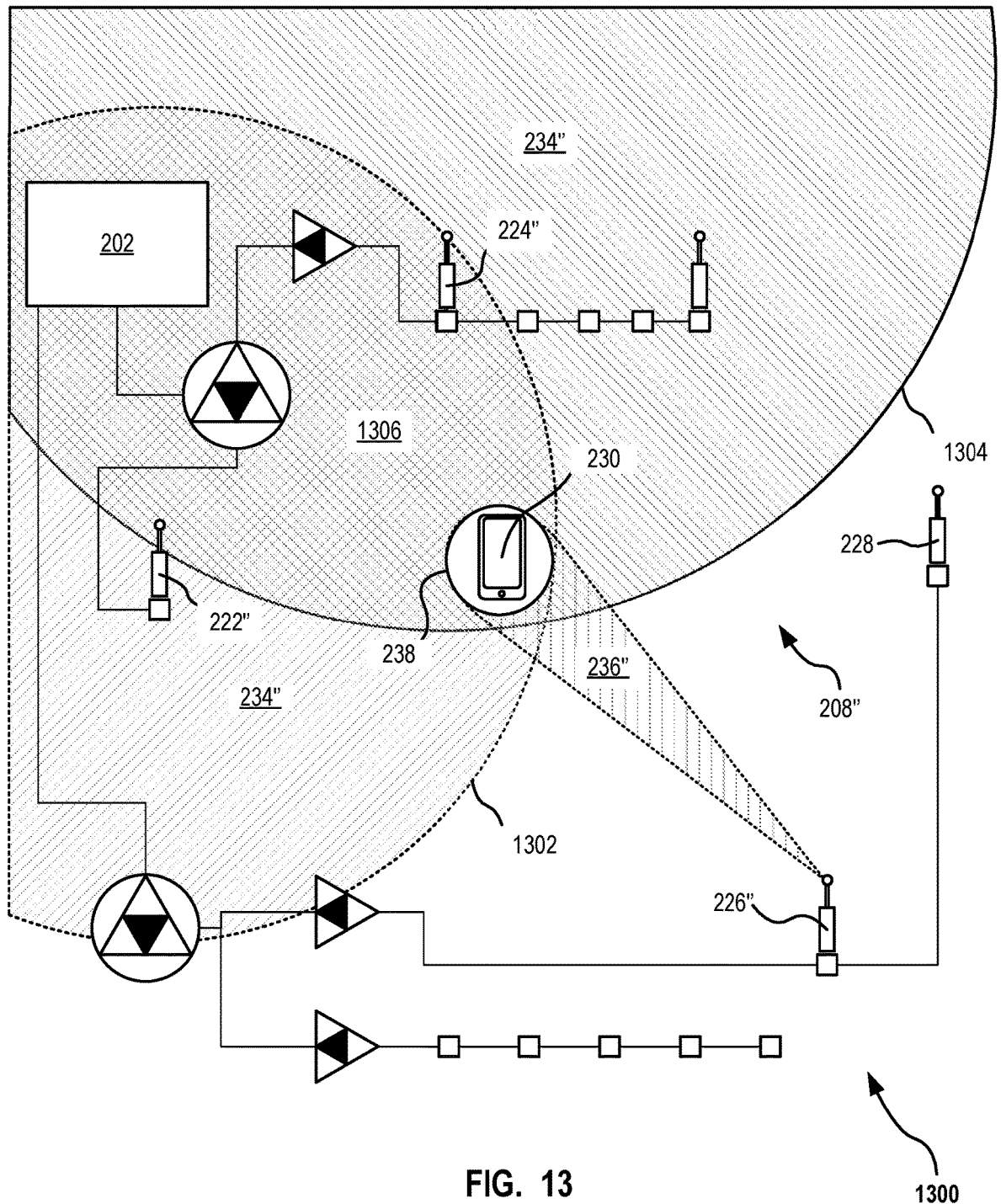

FIG. 13 is a schematic illustration of an alternative data transmission system 1300. In an exemplary embodiment, transmission system 1300 is structurally and functionally similar to transmission system 200, FIG. 2, and analogous elements thereof are therefore labeled and numbered similarly. In the embodiment depicted in FIG. 13, transmission system 1300 is shown to include at least one beamforming transmitter (transmitter 226", in this example) and two non-beamforming transmitters (transmitters 222", 224", in this example) within network 208. Accordingly, transmission system 1300 thus illustrates an example of transmission system 200 utilizing a combination of beamforming and non-beamforming transmission techniques.

In the exemplary embodiment depicted in FIG. 13, transmitters 222" and 224" are illustrated to be omni-directional transmitters, which generate signals 232", 234" over signal transmission areas 1302, 1304, respectively. In this example, signal transmission areas 1302, 1304 are shown to overlap within a signal overlap region 1306, which includes spot 238. Transmitter 226", on the other hand, uses beamforming to generate signal 236" as a focused radiated beam 1316 toward spot 238 within signal overlap region 1306, such that all three signals 222", 224", 236" overlap at spot 238.

According to the innovative configuration of transmission system 1300, network 208" may be flexibly configured and operated to implement both beamforming and non-beamforming techniques that enables conventional network components to nevertheless advantageously utilize the data portion in and/or security key embodiments described above. That is, the security of the wireless transmission of system 1300 may be significantly enhanced, but without requiring significant modification to the structural components thereof. For example, signal overlap region 1306 may represent a relatively narrow extended region where respective transmission areas 1302, 1304 are arranged to coincide with a topographical feature, such as a vehicle travel corridor (e.g., a vehicle highway, railroad track, a flight path of an aircraft, a flight path of a satellite, etc). In an exemplary embodiment, hub 202 is configured to specify a transmit power level of transmitter 226" such that the focused beam of signal 236" is limited to not extend beyond reception capability receiving device 230 within spot 238.

Figure 14:
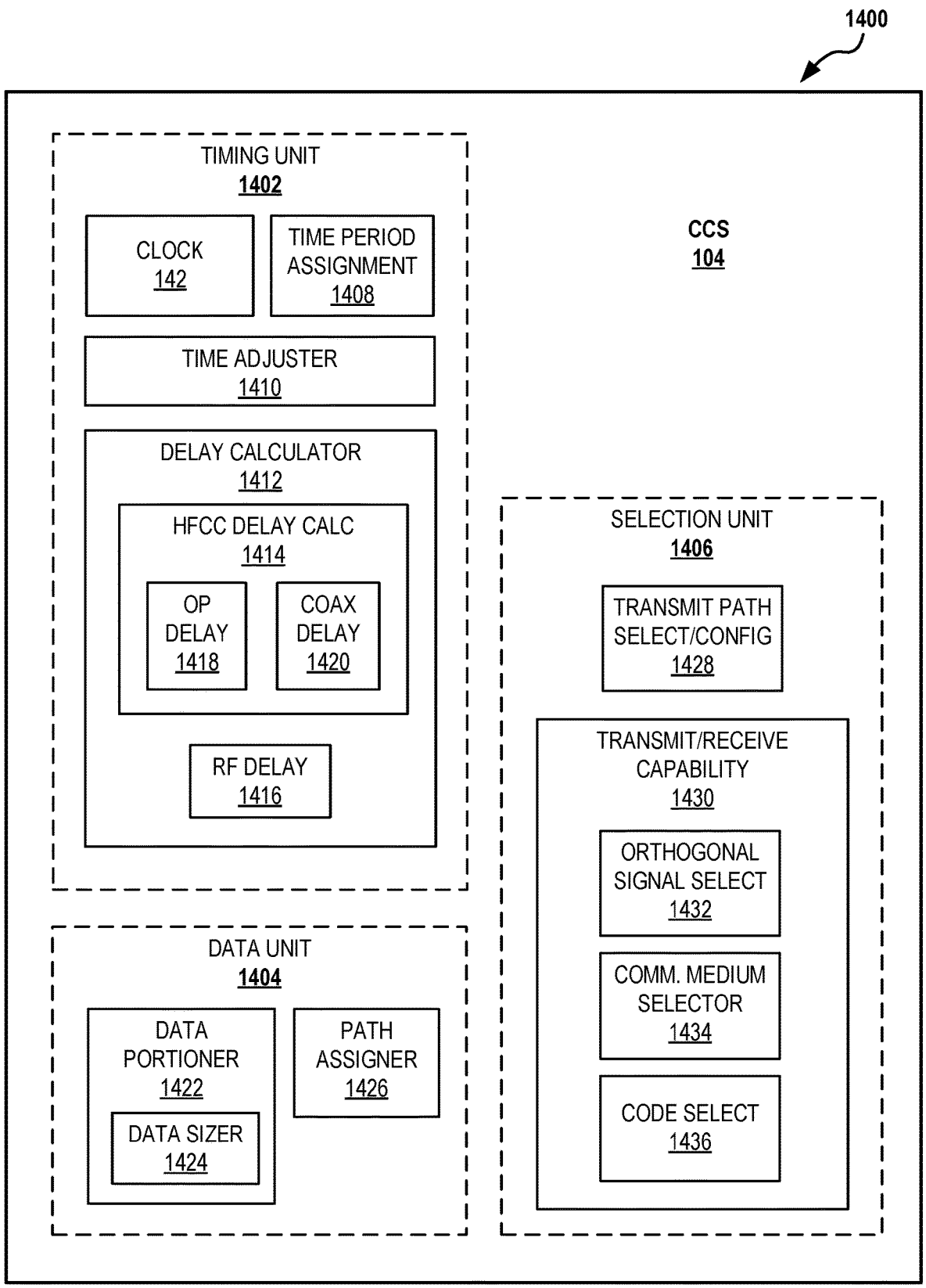

FIG. 14 is a schematic is a schematic illustration of a logical architecture 1400 for CCS 104, FIG. 1. In an exemplary embodiment, CCS 104 may be logically configured to include a timing unit 1402, a data unit 1404, and a selection unit 1406. Timing unit 1402 may include one or more of universal clock 142, a time period assigner module 1408, a time period adjustment module 1410, and a delay calculation module 1412. Delay calculation module 1412 may further include an HFCC delay calculation sub-module 1414 and an RF delay calculation submodule 1416. In an exemplary embodiment, HFCC delay calculation sub-module 1414 further includes an optical delay calculator 1418 and a cable delay calculator 1420.

In the exemplary embodiment, data unit 1404 further includes a data portioning module 1422, which may include a data sizer 1424, and a path assignment module 1426. Selection unit 1406 may include a transmit path selector and figuration module 1428 and a transmit/receive capability module 1430. In an embodiment, transmit/receive capability module 1430 and include one or more of an orthogonal signal selector 1432, a communications medium selector 1434, and a code selector 1436.

In exemplary operation of logical architecture 1400, CCS 104 receives original data, and/or segments or portions of the original data, and assigns each such data portion to a transmission path from hub 102 to receiving device 140 as described above. That is, through the several logical components of architecture 1400, CCS 104 is enabled to determine any delays related to each such transmission path and coordinate the cooperating transmitters such that the data portions are transmitted from the spatially distributed transmitters (e.g., transmitters 122-126, FIG. 1, transmitters 222-226, FIG. 2) but received at receiving device 140/230 as original data. In the exemplary embodiment, universal clock 142 is configured for synchronization of network 110, and which may be augmented by a delay value determined by hub 102 or CCS 104 (or hub 202, FIG. 2) to more effectively ensure a timely reception of portioned data at receiving device 140/230.

Thus, according to logical architecture 1400, CCS 104 of hub 102 (or hub 202) is enabled to determine the respective delays of the various transmission paths, and then apportion the data accordingly. In the exemplary embodiment, such delay determinations may include analyzing one or more delays in each leg of the transmission path. For example, in the case of second transmission path 146, FIG. 1, delay values may be determined for each of the optical leg between hub 102 and fiber node 114(1), the cable leg between fiber node 114(1) and transmitter 124, and/or the wireless leg between transmitter 124 and receiving device 140. In an alternative embodiment, network 110 may directly determine (e.g., measure in real-time) the total delay between hub 102 and receiving device 140. These delays, determined at or before the hub, may thus be propagation delays and/or transmission delays. As used herein, propagation delay refers to time required for a data bit to propagate from one device to the next; transmission delay refers to the time required to get all data bits into the wire, and is sometimes expressed as:

$$\text{transmission\_delay} = \text{packet\_length}/\text{data\_rate}$$

FIGS. 15-18, below, describe respective processes that may be implemented by a processor disposed, for example, within hub 202, FIG. 2, of system 200, or within hub 102 and/or CCS 104 of system 100, FIG. 1. The following processes may further include computer-executable instructions for the respective processor, or may alternatively be executed by one or more dedicated hardware units/modules, or a hybrid combination of hardware and software. The respective steps of the following processes are described by way of example, and not in a limiting manner. That is, the several processes may include steps in addition to those described herein, or in some cases, may omit particular steps that may become redundant or unnecessary in light of other conditions. In some embodiments, unless otherwise described to the contrary, the respective steps may be performed in a different order to those described herein, or two or more steps may be performed simultaneously.

Figure 15:
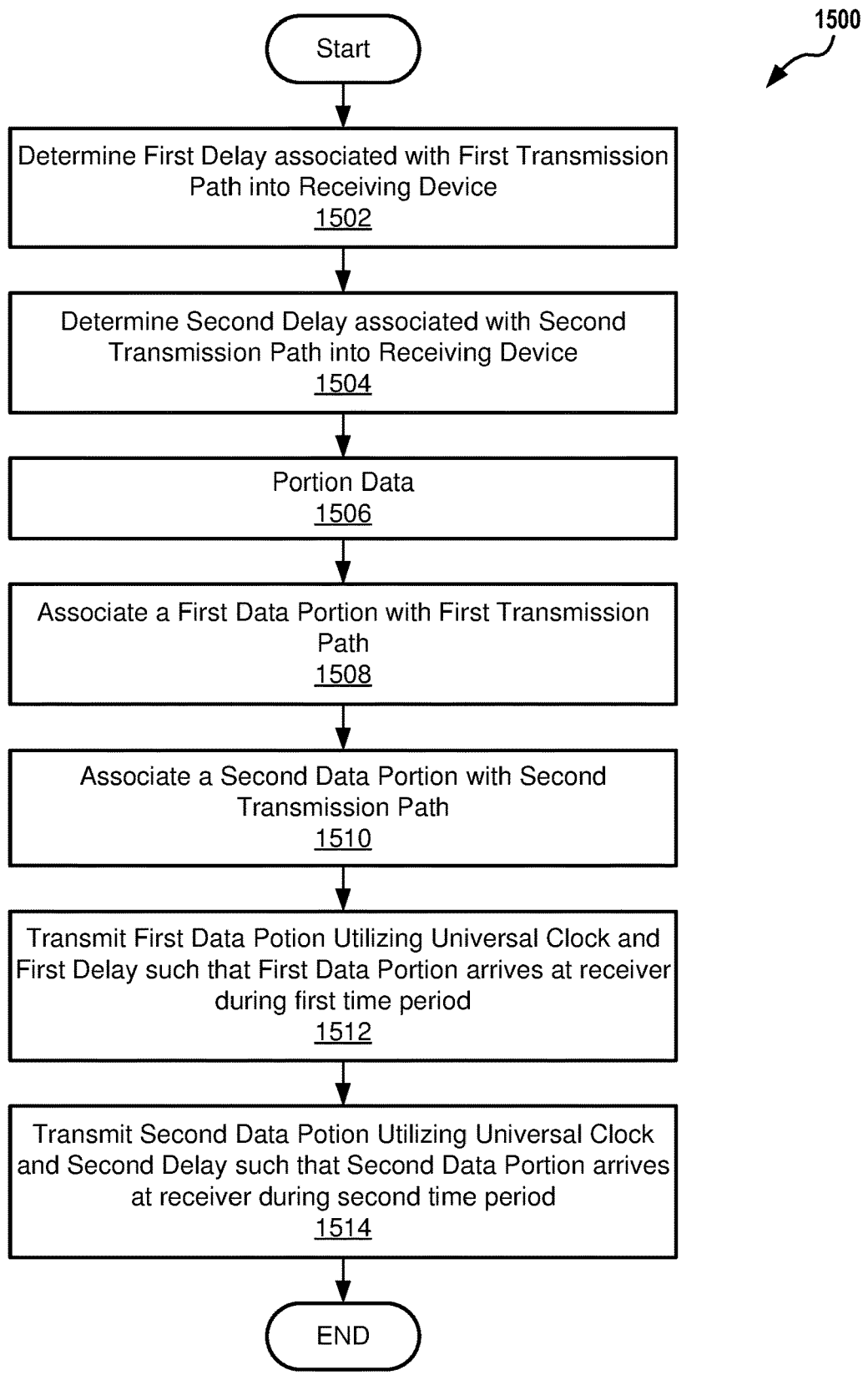

FIG. 15 is a flow diagram of an exemplary data transmission process 1500 that may be implemented with one or more of the embodiments described herein. In an exemplary embodiment, process 1500 begins at step 1502, in which a first delay, associated with a first transmission path (e.g., first transmission path 248, FIG. 2) to the receiving device (e.g., receiving device 140, FIG. 1, receiving device 230, FIG. 2), is determined. In step 1504, a second delay is determined for a second transmission path (e.g., second transmission path 250, FIG. 2) to the receiving device. In step 1506, data from a data package (e.g., data package 240, FIG. 2) is portioned into respective data sub-portions (e.g., data portions 242, 244, 246).

In an exemplary embodiment of step 1506, the data portioning further includes dividing a security key into the respective data portions and/or sub-portions. In at least one embodiment of step 1506, each separate data portion or sub-portion may be separately processed within hub 102. For example, each block of portioned data may be encrypted separately from other of portioned data, and thus transmitted separately from the other blocks.

In step 1508, the first data portion is associated with the first transmission path and, in step 1510, the second data portion is associated with the second transmission path. Subsequently, in step 1512, the first data potion is transmitted along the first transmission path and, in step 1514, the second data potion is transmitted along the second transmission path. In exemplary embodiments of steps 1512 and 1514, a universal clock (e.g., clock 142, FIG. 1) is utilized to implement the first and second determined delays, respectively, such that the first data portion arrives at the receiving device during a first time period of the universal clock signal (e.g., period 302(1) of clock signal 302, FIG. 3A), and the second data portion arrives at the receiving device during a second time period of the clock signal (e.g., period 302(2)).

In an exemplary embodiment of process 1500, each block of portioned (i.e., step 1506) and transmitted (i.e., steps 1512, 1514) data may be subsequently processed separately on a receiving device. For example, where one or more data/key blocks are encrypted at the hub, each received block of portioned data may then be decrypted separately from other blocks of portioned data, and then subsequently rejoined with the other decrypted blocks of portioned data to form a decrypted data stream that effectively duplicates the original sequence of data in the data package prior to the portioning in step 1506.

Figure 16:
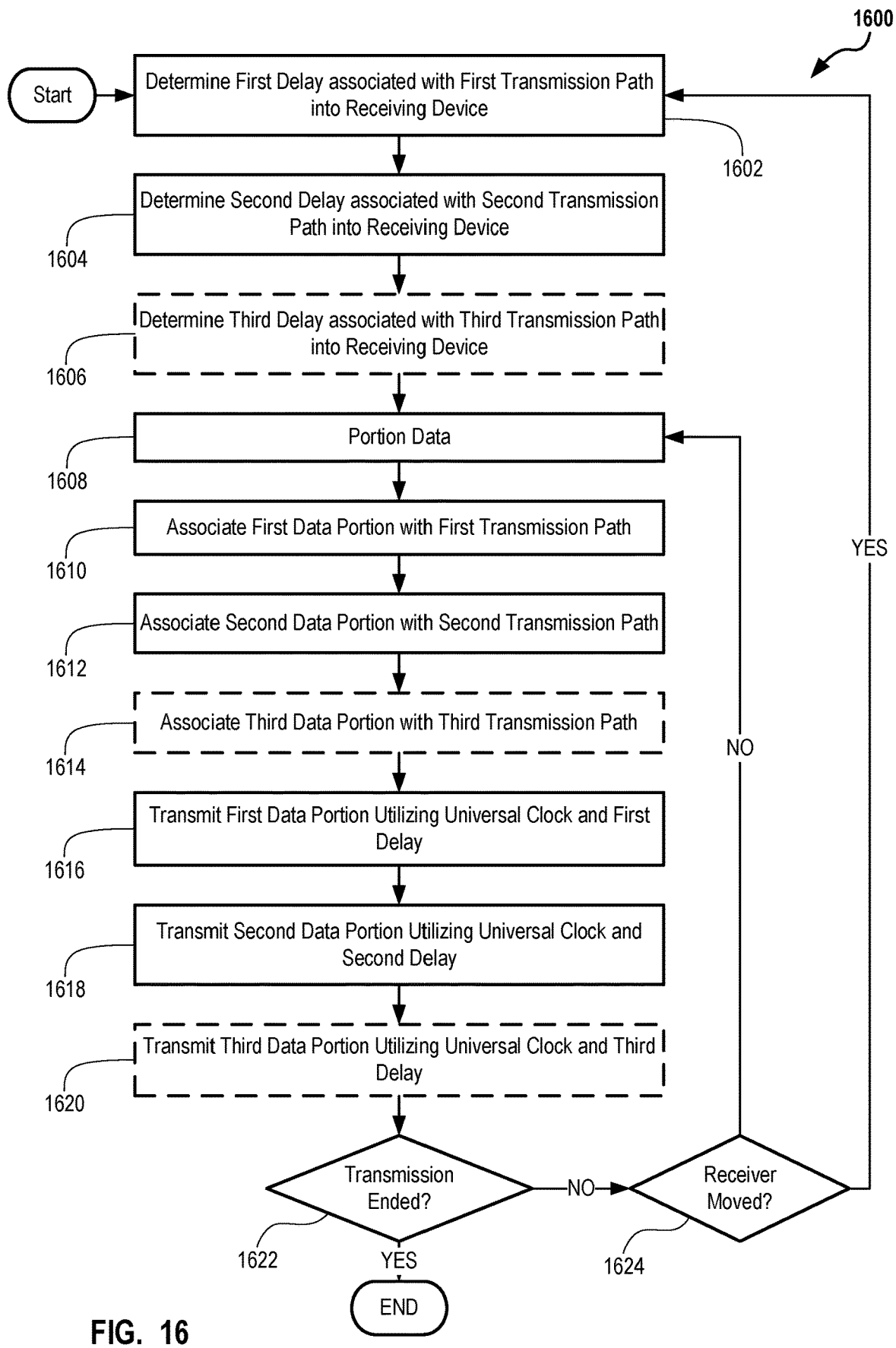

FIG. 16 is a flow diagram of an alternative data transmission process 1600 that may be implemented with one or more of the embodiments described herein. Process 1600 is similar to process 1500, FIG. 15, except that process 1600 further accounts for additional transmission paths, and also for movement of the receiving device during the duration of data transmission.

In an exemplary embodiment, process 1600 begins at step 1602, in which a first delay, associated with a first transmission path to the receiving device, is determined, similar to step 1502, FIG. 15. In step 1604, a second delay is determined for a second transmission path to the receiving device, similar to step 1504. In the exemplary embodiment depicted in FIG. 16, step 1606 is optional. That is, in step 1606, a third delay is determined for a third transmission path (e.g., third transmission path 252, FIG. 2) to the receiving device. In an exemplary embodiment, step 1606 is repeated for each additional transmission path utilized for data transmission. In step 1608, data from the data package is apportioned into respective data sub-portions, similar to step 1506, FIG. 15, and thus may include a security key, security key portions, and/or noise components.

In some embodiments, the data may be portioned into larger or smaller segments for transmission over different transmission paths. That is, some data segments may be of the same size or a different size from other segments. Alternatively, the data segments may be equal in size and transmitted over the different transmission paths for security purposes, or some segments may have different sizes from one another to accommodate the different respective delays associated with the several transmission paths. In at least one embodiment, the data segments may be sized to substantially equalize the sequential arrival times of the data portions at the receiving device.

In step 1610, the first data portion is associated with the first transmission path and, in step 1612, the second data portion is associated with the second transmission path, similar to steps 1508, 1510, respectively. Step 1614 is optionally implemented in the case where at least one additional transmission path is utilized. In optional step 1614, the third (or greater) data portion is associated with the third (or greater) transmission path. In step 1616, the first data potion is transmitted along the first transmission path and, in step 1618, the second data potion is transmitted along the second transmission path, similar to steps 1512, 1514, respectively. Step 1620 is optionally implemented in the case where an additional transmission path is utilized. In optional step 1620, the third data portion is similarly transmitted along the third transmission path.

In exemplary embodiments of steps 1616, 1618, 1620, each data segment/portion may be associated with the respective transmission path randomly or, alternatively, the data segments/portions may be selected for a respective transmission path based on matching characteristics of the data segment/portion to particular characteristics of the transmission path. For example, a transmission path experiencing propagation or transmission delays may be associated with a smaller segment size or having a lesser transmission start delay. In the exemplary embodiment, the universal clock is utilized to implement the first, second, and third determined delays, respectively, such that the respective data portions arrive at the receiving device during the desired time periods of the clock signal.

Step 1622 is a decision step. In step 1622, process 1600 determines whether the transmission of the data stream of the data package has ended. If, in step 1622, process 1600 determines that the transmission has ended, process 1600, concludes portioning and transmission of the data stream to the receiving device. If, however, in step 1622, process 1600 determines that the transmission has not ended, process 1600 proceeds to step 1624.

Step 1624 is also a decision step. In step 1624, process 1600 determines whether the receiving device has moved (e.g., away from spot 138, FIG. 1, spot 238, FIG. 2). If, in step 1624, process 1600 determines that the receiving device has moved, process 1600 returns to step 1602, and subsequently repeats the entirety of process 1600. If, however, in step 1624, process 1600 determines that the receiving device has not moved, process 1600 instead returns to step 1608, in which the continuing transmission is again apportioned according to one or more of the embodiments described herein. That is, in the case where the receiving device has not moved, but the data transmission continues, the respective delay values of the transmission paths need not be recalculated (i.e., assuming that other system measurements and/or real-time conditions remain unchanged).

Figure 17:
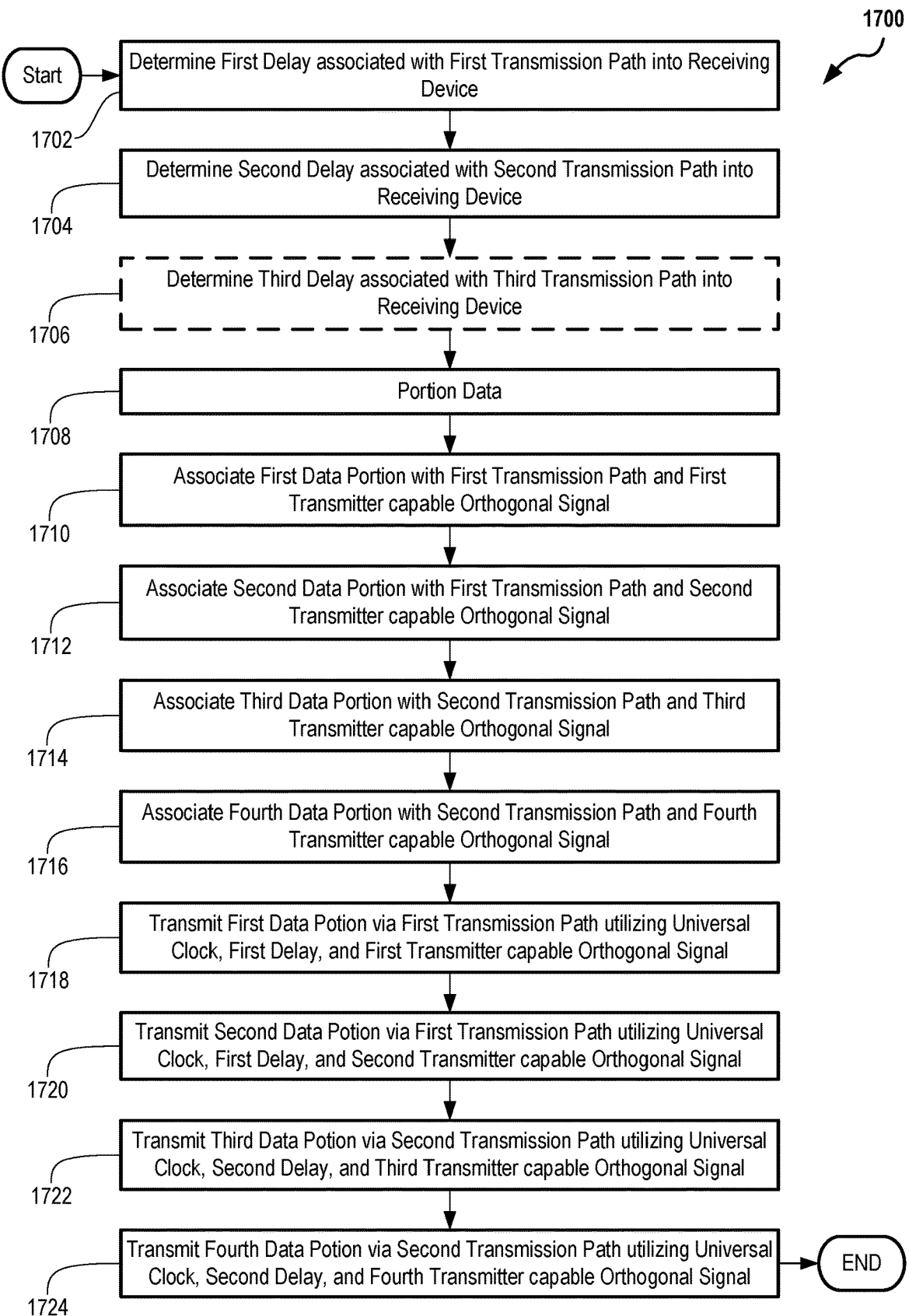

FIG. 17 is a flow diagram of an alternative data transmission process 1700 that may be implemented with one or more of the embodiments described herein. Process 1700 is similar to process 1500, FIG. 15, except that process 1700 further utilizes one or more transmitters capable of encoding and transmitting orthogonal signals and orthogonal signal portions.

In an exemplary embodiment, process 1700 begins at step 1702, in which a first delay is determined for a first transmission path to the receiving device, similar to step 1502, FIG. 15. In step 1704, a second delay is determined for a second transmission path to the receiving device, similar to step 1504. In an optional step 1706, a third delay is determined for a third transmission path (or additional paths) to the receiving device. In step 1708, data from the data package is apportioned into respective data sub-portions, similar to step 1506, FIG. 15, and thus may include a security key, security key portions, and/or noise components.

In step 1710, a first data portion is associated with the first transmission path, similar to step 1508, FIG. 15. In an exemplary embodiment of step 1710, the first data portion is further associated with a first transmitter capable of encoding and transmitting orthogonal signals. In step 1712, a second data portion is also associated with the first transmission path, but alternatively with a second transmitter capable of encoding and transmitting orthogonal signals. In step 1714, a third data portion is associated with the second transmission path, but with a third transmitter capable of encoding and transmitting orthogonal signals. In step 1716, a fourth data portion is also associated with the second transmission path, but alternatively with a fourth transmitter capable of encoding and transmitting orthogonal signals.

In step 1718, the first data portion is transmitted along the first transmission path utilizing the universal clock, the first determined delay value, and the first transmitter capable of encoding and transmitting an orthogonal signal. In step 1720, the second data portion is transmitted along the first transmission path utilizing the universal clock, the first determined delay value, and the second orthogonal-capable transmitter. In step 1722, the third data portion is transmitted along the second transmission path utilizing the universal clock, the second determined delay value, and the third orthogonal-capable transmitter. In step 1724, the fourth data portion is transmitted along the second transmission path utilizing the universal clock, the second determined delay value, and the fourth orthogonal-capable transmitter. According to the exemplary embodiment, four separate data portions may be transmitted along only to respective transmission paths, but eventually received and subsequently transmitted by four separate respective orthogonal-capable transmitters.

Figure 18:
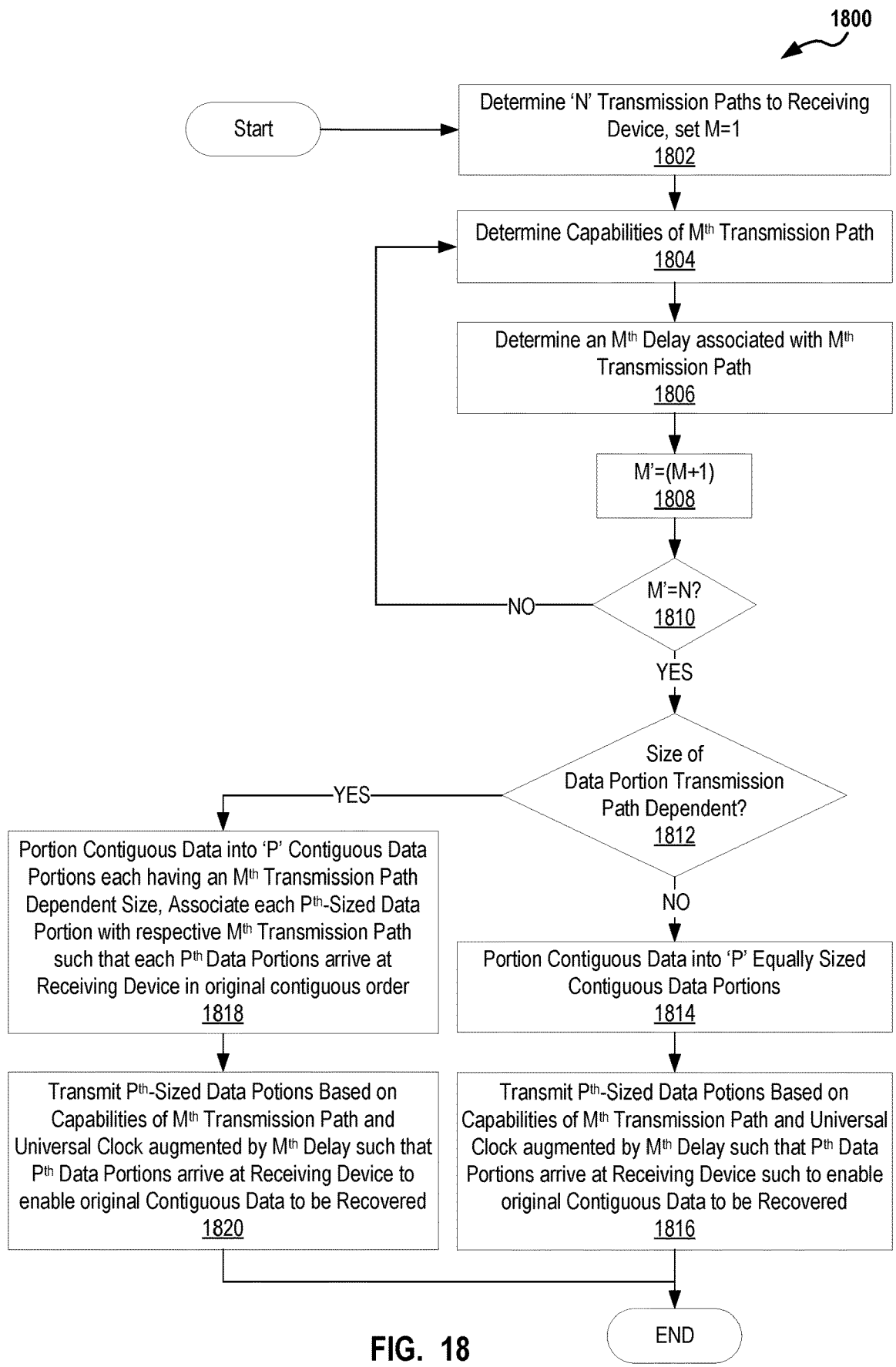

FIG. 18 is a flow diagram of an alternative data transmission process 1800 that may be implemented with one or more of the embodiments described herein. Process 1800 begins at step 1802, in which process 1800 determines a number, N, of transmission paths and/or path segments/legs available between the hub and the eventual receiving device. In an exemplary embodiment of step 1802, N may constitute a value that is determined automatically for transmission paths that have or demonstrate a desired minimum capacity for additional traffic or other selection criteria, such as, but not limited to transmission path delays, direction and speed of the receiving device when mobile, predictive modeling of a path of travel of the mobile receiving device, a weakest link analysis of each transmission path, and a best match of transmission path delays for a given transmission strategy. In some embodiments of step 1802, the value for N may be preprogrammed, or may be a manually set predetermined value.

In the exemplary embodiment of step 1802, process 1800 additionally sets a counter, M, such that M=1 in the first iteration of process 1800. In step 1804, the particular capabilities are determined for the $M^{th}$ transmission path being evaluated. In step 1806, an $M^{th}$ delay value is associated with that particular $M^{th}$ transmission path. In step 1808, the value for the counter M is increased by 1, such that M'=M+1. Step 1810 is a decision step. If, in step 1810, process 1800 determines whether M'=N, meaning that the first portion of process 1800 has successfully and separately evaluated each of the different $M^{th}$ transmission paths and respective $M^{th}$ delay values associated therewith. If, in step 1810, process 1800 determines that M' ≠N, process 1800 returns to step 1804, in which the capabilities of the $M'^{th}$ transmission path (i.e., M+1) are determined. If, however, in step 1810, process 1800 determines that M'≠N, process 1800 proceeds to step 1812.

Step 1812 is a decision step. In step 1812, process 1800 determines whether the size of a data portion transmission is path dependent. If, in step 1812, process 1800 determines that the size of the data portion transmission is not path dependent, process 1800 proceeds to step 1814, in which portions of contiguous data are apportioned into 'P' contiguous data portions, each of equal size. In step 1816, the $P^{th}$-sized data portions are transmitted based on the capabilities of the particular $M^{th}$ transmission path and a universal clock, augmented by the $M^{th}$ delay such that the $P^{th}$ data portion arrives at receiving device in a manner that enables that the original contiguous data to be recovered in the proper sequence.

Alternatively, referring back to decision step 1812, if however, step 1812 determines that the size of the data portion being transmitted is path dependent, then process 1800 proceeds instead to step 1818, in which the contiguous data is portioned into 'P' contiguous data portions, where each such $P^{th}$ contiguous data portion has a size dependent on the particular $M^{th}$ transmission path of the particular iteration and each $P^{th}$ sized data portion is associated with the respective $M^{th}$ transmission path such that each of the $P^{th}$ data portions arrive at the receiving device in a contiguous order substantially conforming to the sequence of the original data. In step 1820, the $P^{th}$ sized data potions are transmitted based on the capabilities of the $M^{th}$ transmission path, and the universal clock is augmented by the determined $M^{th}$ delay value, such that the $P^{th}$ data portions arrive at the receiving device such that the original contiguous data may be recovered in an order substantially conforming to the original order of the data back.

Exemplary embodiments of coordinated wireless security enhancement systems and methods are described above in detail, as well as particular embodiments relating to exclusion zone management. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of securing a transmission of a contiguous stream of data from a plurality of spatially distributed transmitters to one receiving device such that the transmitted contiguous stream of data is received at a location of the receiving device, said method comprising:
    portioning the contiguous stream of data into at least a first data portion and a second data portion;
    coordinating the first and second transmitters such that the first and second data portions arrive at the one receiving device as the contiguous stream of data;
    transmitting the first data portion to the one receiving device by a first transmitters at a first time and transmitting the second data portion to the one receiving device by a second transmitters at a second time, wherein the first and second transmitters are spatially separated and the first and second transmission overlap in space, but not time, at the one receiving device;
    utilizing a coordinating system such that the plurality of data portions arrive at the receiving device in a first order; and
    arranging the received plurality of data portions from the first order into a second order for the received contiguous stream at the receiving device such that the second order of the received contiguous stream follows a sequence substantially similar to a sequence of the input stream of data.

2. The method of claim 1, wherein portioning the contiguous stream of data into the first and second data portions comprises portioning the contiguous stream of data into the first and second data portions that are each are associated with one of the first and second spatially distributed transmitters.

3. The method of claim 1, wherein transmitting the first and second data portions via first and second transmission paths further comprises providing a timestamp to each first and second data portions.

4. The method of claim 1, further comprising arranging the received first and second data portions from a received first order to a second order reflective of the contiguous stream of data.

5. The method of claim 1, wherein one or more of the first and second data portions are encrypted, said method further comprising transmitting one or more portions of a security key via one or more of the first and second transmission paths.

6. The method of claim 5, wherein transmitting one or more portions of a security key via one or more of the first and second transmission paths comprises transmitting one or more portions of a security key via a plurality of the one or more of the first and second transmission paths on a randomly rotating basis.

7. The method of claim 1, further comprising:
transmitting the security key and a first generated noise signal via one or more transmission paths of the respective transmission paths; and
transmitting a second generated noise signal via one or more transmission paths of the respective transmission paths to the receiving device, the second generated noise signal cancelling the first generated noise signal where the respective transmission paths carrying the first and second generated noise signals overlap.

8. The method of claim 1, further comprising arranging the received plurality of data portions from the first order into a second order such that the second order of the received contiguous stream follows a sequence substantially similar to the sequence of the contiguous stream of data.

9. The method of claim 1, further comprising receiving the first and second data portions in an original order of the contiguous stream of data.

10. The method of claim 1, wherein the first and second transmissions paths overlap in space at a first area around the receiving device and do not overlap in space outside the first area.

11. The method of claim 1, further comprising a third data portion transmitted from a third transmitter at a third time such that the first, second, and third data portions are received at the receiving device in a time organized manner such that the first, second, and third data portions may be assembled in the contiguous stream of data.

12. The method of claim 1, further comprising a third data portion transmitted from a third transmitter at a third time such that the first, second, and third data portions are received at the receiving device in a time organized manner as the contiguous stream of data.

* * * * *